United States Patent [19]

Zhiglinsky et al.

[11] Patent Number: 5,418,803
[45] Date of Patent: May 23, 1995

[54] WHITE LIGHT LASER TECHNOLOGY

[75] Inventors: Andrei G. Zhiglinsky; Alexander M. Izmailov, both of St. Petersburg, Russian Federation

[73] Assignee: American Biogenetic Sciences, Inc., Copiague, N.Y.

[21] Appl. No.: 180,408

[22] Filed: Jan. 11, 1994

[51] Int. Cl.6 .................................................. H01S 3/10
[52] U.S. Cl. ......................................... 372/23; 372/102; 372/101; 372/98; 372/69; 372/66; 372/39
[58] Field of Search .................... 372/102, 101, 23, 69, 372/70, 98, 39

[56] References Cited

U.S. PATENT DOCUMENTS

| | | |
|---|---|---|
| 3,735,280 | 5/1973 | Johnston, Jr. . |
| 3,774,121 | 11/1973 | Ashkin et al. . |
| 3,928,817 | 12/1975 | Chodzko . |
| 3,993,963 | 11/1976 | Logan et al. . |
| 4,173,738 | 11/1979 | Boling et al. . |
| 4,287,486 | 9/1981 | Javan . |
| 4,494,235 | 1/1985 | Guch, Jr. et al. . |
| 4,502,144 | 2/1985 | Suhre . |
| 4,710,937 | 12/1987 | Oomori et al. . |
| 4,731,794 | 3/1988 | Schafer . |
| 4,759,026 | 7/1988 | Hollins et al. . |
| 4,821,280 | 4/1989 | Kawase . |
| 4,945,544 | 7/1990 | Tanaka et al. . |
| 5,131,002 | 7/1992 | Mooradian . |

FOREIGN PATENT DOCUMENTS

| | | |
|---|---|---|
| 1718313A1 | 7/1992 | Russian Federation . |
| 1778840A1 | 11/1992 | Russian Federation . |
| 1778841A1 | 11/1992 | Russian Federation . |
| PCT/SU89/-00163 | 11/1990 | WIPO . |

*Primary Examiner*—Léon Scott, Jr.
*Attorney, Agent, or Firm*—Pennie & Edmonds

[57] ABSTRACT

A laser capable of generating polychromatic or whim light radiation is realized by employing a diffraction grating and reflecting element as the ends of a simple laser resonator cavity. The dispersive element either solely or in combination with an intracavity lens is arranged such that each wavelength component of the white light radiation is amplified by a different portion of the active medium. Forced oscillation or positive feedback for each wavelength component is achieved by operating the diffraction grating in an auto-collimation configuration.

111 Claims, 16 Drawing Sheets

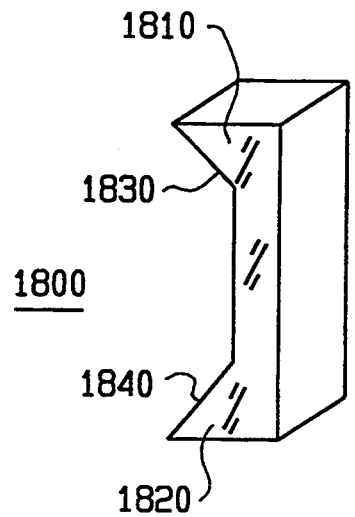 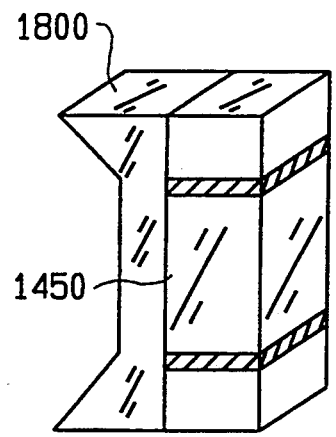
FIG. 18    FIG. 19
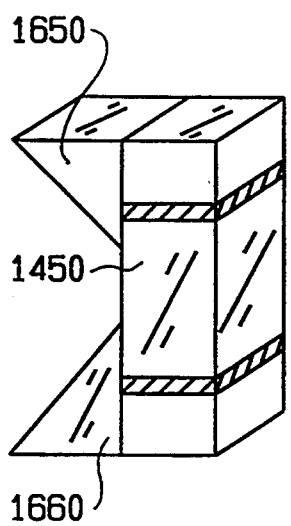 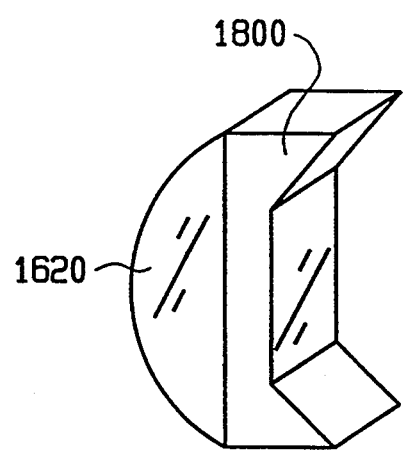
FIG. 20    FIG. 21

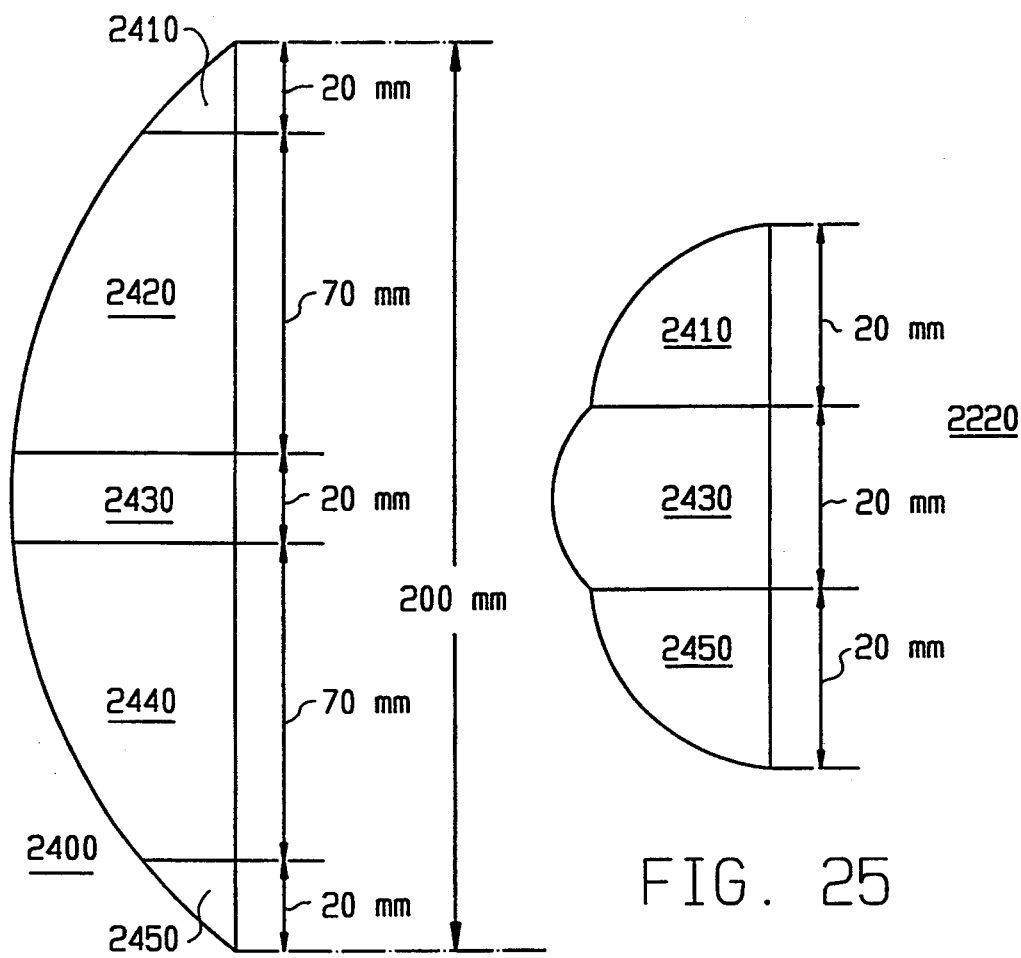
FIG. 24
FIG. 25
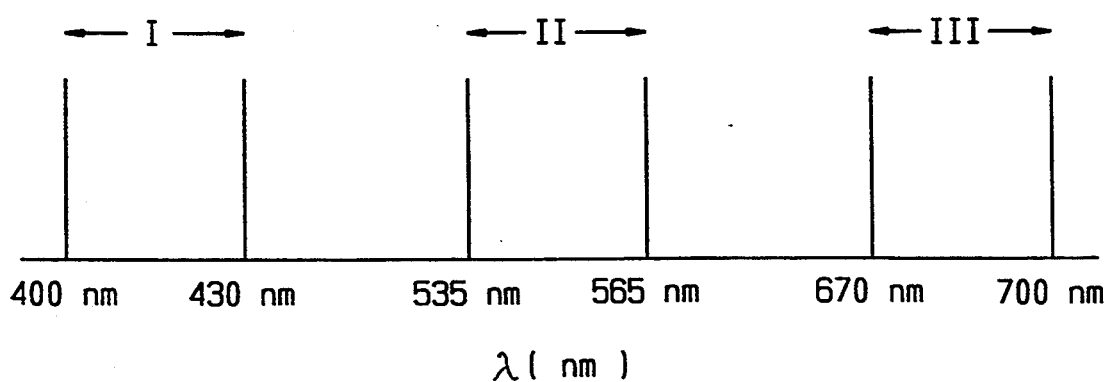
FIG. 26

WHITE LIGHT LASER TECHNOLOGY

CROSS-REFERENCE TO RELATED APPLICATIONS

This application is related to our U.S. patent application Ser. Nos. 8/180,401 and 8/180,407, which were filed concurrently herewith. The above-identified co-pending applications, which are commonly assigned, are incorporated herein by reference.

TECHNICAL FIELD

This invention relates to lasers, and more particularly to lasers having a polychromatic spectrum or "white light" spectrum.

BACKGROUND OF THE INVENTION

Although conventional lasers emitting coherent radiation at a single wavelength have become indispensable research tools, for many applications there is still a need for a laser emitting simultaneously at a plurality of predetermined wavelengths or with a predetermined spectral composition. The realization of a polychromatic or white light laser provides novel approaches in numerous fields such as medicine, spectroscopy, holography, photo-chemistry, isotope separation, spectrum analysis, optical measurement, and/or ultra-short light pulse generation. In medicine, for example, white light lasers may be used to irradiate human organs with radiation whose spectrum is optimal with respect to the absorption characteristics of the organ under treatment. Accordingly, the development of polychromatic or white light lasers is of a particular interest to the scientific community. See also, for example, "White Light Laser," *Applied Optics,* Vol. 9, No. 5, p. 1209 (1970).

With respect to polychromatic or white light lasers, selected documents as discussed below are of interest.

U.S. Pat. No. 3,928,817 discloses a laser resonator for achieving force oscillation at multiple wavelengths. Multiple-selected line operation is achieved with diffraction gratings and mirrors forming an independent three-element cavity for each desired wavelength. Oriented at the appropriate angle, the diffraction gratings allow regenerative amplification for the vibrational levels of the active medium disposed within the cavity.

U.S. Pat. No. 4,298,486 discloses laser resonator cavities comprising at least one active medium disposed in an optical cavity. A pair of similar intracavity spectral dispersion means allow radiation of different wavelengths to be regeneratively amplified in co-parallel regions of the active medium. Moreover, apertures within the cavity are positioned to transmit and block selected radiation wavelengths to produce forced oscillation at more than one wavelength.

U.S. Pat. No. 4,759,026 discloses a dye laser capable of lasing simultaneously at a plurality of wavelengths. A plurality of transparent containers transversely staggered are positioned between a partially-reflecting mirror and an adjustable retro-reflecting diffraction grating. The containers enclosing three separate dye solutions are pumped to generate spontaneous emission from each of the dye solutions. With the diffraction grating operating in three different diffraction orders, three parallel, but staggered cavities, are formed to effect lasing at three different wavelengths.

PCT application PCT/SU 89/00163 and Russian patent SU 1718313 disclose a white light laser comprising an active medium disposed within an optical cavity. The optical cavity comprises a diffraction grating operating in an auto-collimation mode, a pair of achromatic lenses positioned on opposite sides of the active medium, and a mirror. The diffraction grating and mirror form the ends of the optical cavity. Through the use of optical waveguides, the active medium is pumped along discrete portions. Spontaneous radiation emitted by the active medium propagates through one of the achromatic lens and is then incident on the diffraction grating as collimated beams of varying angles of incidence. In accordance with the diffraction grating equation, for each collimated beam, only one wavelength component is diffracted back along the propagation direction onto the corresponding pumped portion of the active medium. Subsequently, the back reflected radiation is amplified by the active medium and then focused by the second achromatic lens onto the mirror. With the mirror reflecting the amplified radiation back through the active medium, simultaneous lasing is achieved for different discrete wavelengths.

Although the above polychromatic or white light lasers perform acceptably, the optical cavity structures are somewhat complex and large. Moreover, the overall performance, such as the spectral linewidth, intracavity loss, and optical efficiency, is limited and critically dependent on the complexity of the cavity structure.

In view of the reducing the complexity, it is therefore desirable to develop polychromatic or white light lasers not only having a simple cavity structure, but also having an enhanced and controllable spectrum.

SUMMARY OF THE INVENTION

A laser capable of generating polychromatic or white light radiation is realized by employing a diffraction grating and reflecting element as the ends of a simple laser resonator cavity. The diffraction grating either solely or in combination with an intracavity lens is arranged such that each wavelength component of the white light radiation is amplified by a different portion of the active medium. Forced oscillation or positive feedback for each wavelength component is achieved by operating the diffraction grating in an auto-collimation configuration.

Advantageously, the simplicity of the optical cavity provides the benefits of having compatible means necessary to enhance the overall optical performance, including enhanced optical efficiency and control of the spectral characteristics of the polychromatic or white light radiation.

In preferred embodiments, a plane diffraction grating serves to effect the forced oscillation or positive feedback via one of its diffraction orders, with the wavelength components of the polychromatic or white light radiation egressing from the optical cavity as co-linear beams or spatially separated beams along an axis perpendicular to the axis of propagation. In other embodiments, concave and variable spacing diffraction gratings may be used to ensure that each wavelength component is amplified by a different portion of the active medium, without the need for an intracavity lens.

In certain embodiments, the intracavity lens may have a variable focal length which serves to adjust the linewidth and bandwidth of the polychromatic or white light radiation. And, in yet other embodiments, the intracavity lens may include several segmented lens portions, each having a center of curvature offset from the axis of the optical cavity. Moreover, each segmented lens portion may have a different focal length. Such an intracavity lens provides a means for independently adjusting the linewidth of a desired wavelength component of the white light radiation and the spectral range over which that wavelength component may be tuned.

Yet still in other embodiments, a multi-sided prism may be used to control the spectral characteristics of the polychromatic or white light radiation.

In other embodiments, the active medium may include multi-dye cells which serve to provide tunable wavelength components over a wider band than that provided by a single dye. Prism disposed between the active medium and the intracavity lens may be used to compensate for the inability of the cell boundary walls of the multi-dye cells to lase.

According to another aspect of the invention, polychromatic or white light radiation having a plurality of wavelengths components each separated spatially along an axis may be united into one co-linear beam through the use of an external diffraction grating.

In the embodiments mentioned, the polychromatic or white light radiation may be either be discrete or continuous. Additionally, the intracavity lens, active medium and mirror may be integrated as a single element.

BRIEF DESCRIPTION OF THE DRAWINGS

A more complete understanding of the invention may be obtained by reading the following description in conjunction with the appended drawing in which like elements are labeled similarly and in which:

FIGS. 18 is an illustration of a compensatory plate having optical edges that function as prisms;

FIG. 19 is an illustration of the compensatory plate of FIG. 18 integrated with a multi-compartment dye cell;

FIG. 20 is an illustration of the pair of prisms shown in FIG. 16 integrated with a multi-compartment dye cell;

FIG. 21 is an illustration of the compensatory plate of FIG. 18 integrated with an intracavity lens;

FIG. 24 is an illustration of a 500 mm plano-convex lens divided into five segmented portions;

FIG. 25 is an illustration of a segmented intracavity lens formed from three segmented portions of the plano-convex lens of FIG. 24;

FIG. 26 is a graph of the characteristic range of spectral tunability for a polychromatic or white light laser using the intracavity lens of FIG. 25;

DETAILED DESCRIPTION

The invention provides a polychromatic or white light laser that utilizes a spectral dispersive element and reflecting element as the ends of a simple laser resonator cavity. The dispersive element either solely or in combination with an intracavity lens functions to map spatially the spontaneous emission from the active medium into amplified radiation of a corresponding wavelength. Radiation, each of a unique wavelength, is selectively amplified within a distinct portion of the active medium and within a single optical cavity. More particularly, the dispersive element provides selective optical feedback for the desired wavelengths. Because each wavelength uniquely corresponds to the spatial location of a portion of the active medium, the desired wavelengths may be chosen by appropriately pumping the active medium.

Without any loss of generality or applicability for the principles of the present invention, in some embodiments the description is with respect only to the generation of either a discrete spectrum or a continuous radiation spectrum. It should, however, be understood that each embodiment is generally capable of generating both types, discrete or continuous, depending on the pump configuration.

Figure 1:
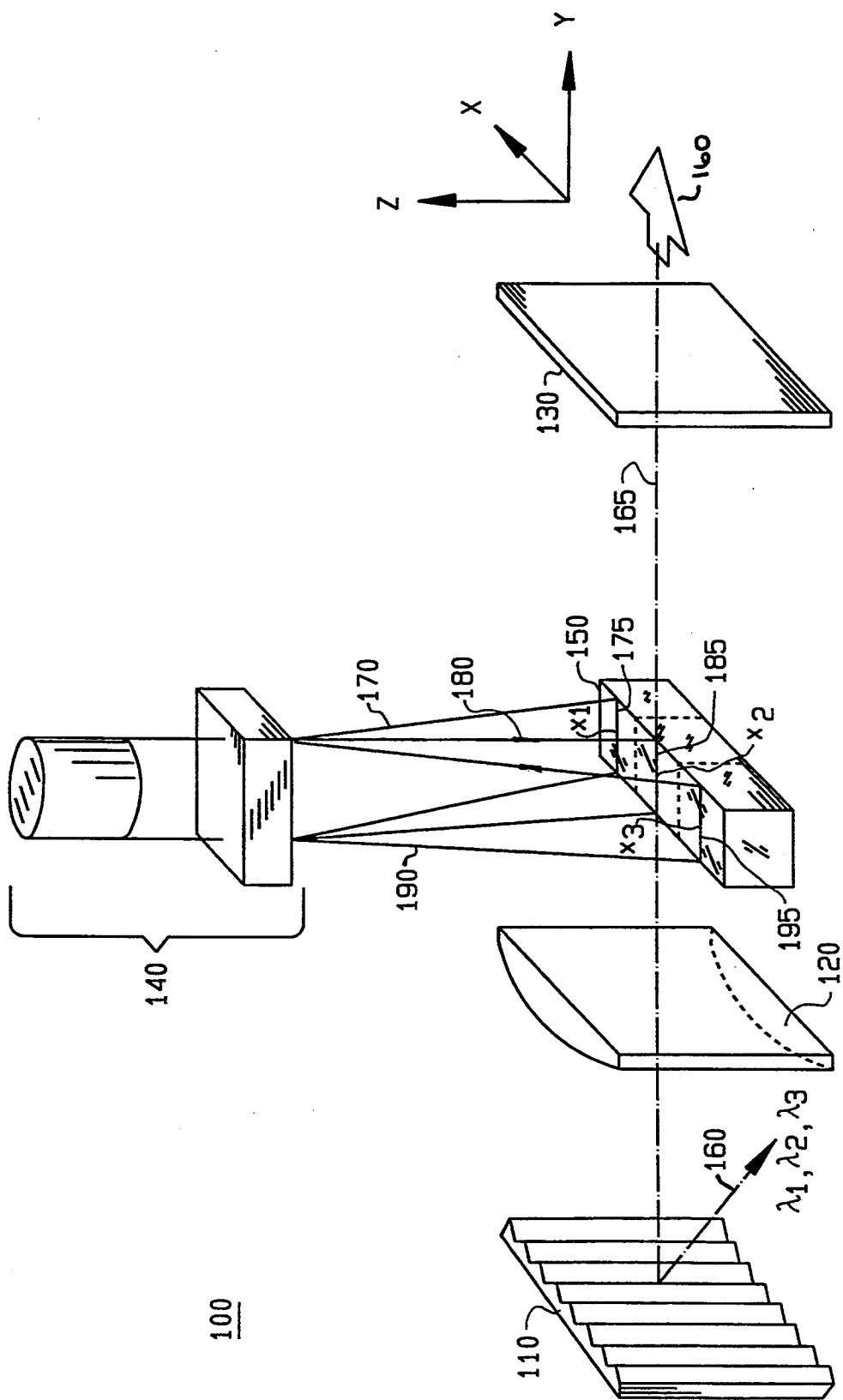
FIG. 1 is schematic plan view of a first embodiment of a polychromatic or white light laser with independently tunable spectral components in accordance with the present invention.
Figure 2:
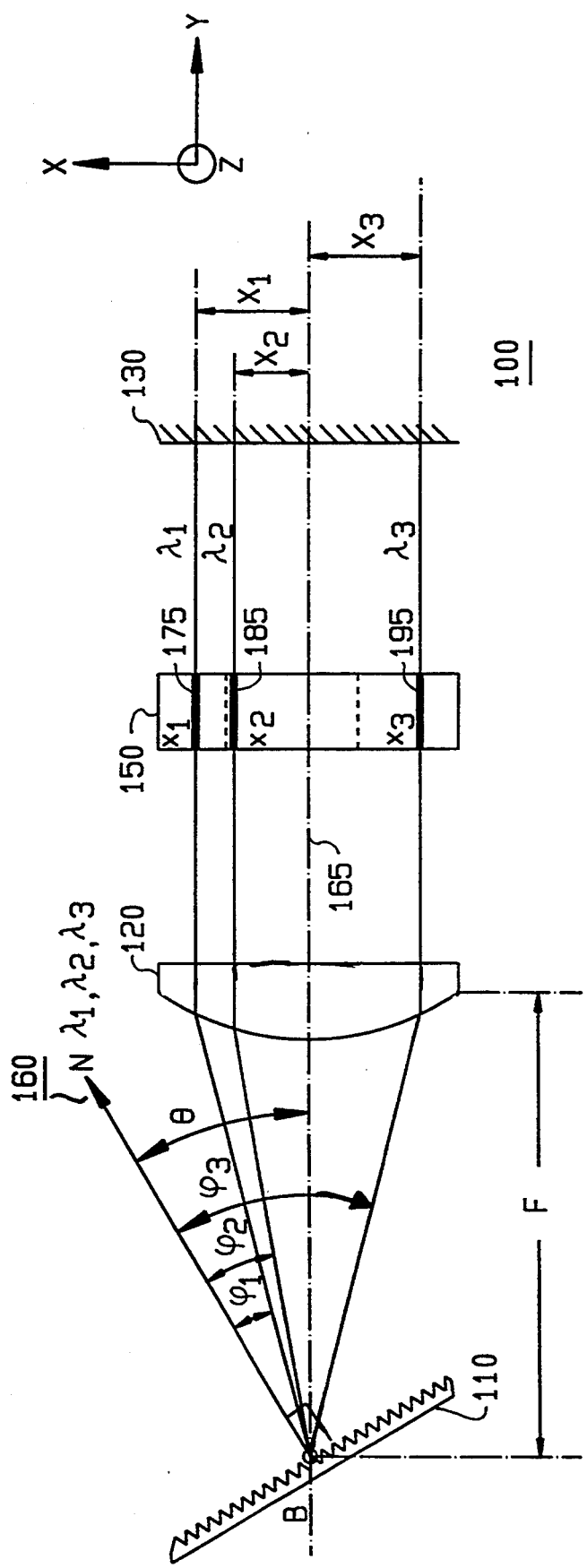
FIG. 2 is an elevation of the white light laser of FIG. 1 with the pump means omitted for clarity.

A first exemplary embodiment of a polychromatic or white light laser in accordance with the principles of the invention is schematically depicted in FIGS. 1 and 2. White light laser 100 comprises a diffraction grating 110, cylindrical lens 120, mirror 130, pump means 140 and active medium 150. Active medium is disposed between lens 120 and mirror 130. Diffraction grating 110 is located a focal length, F, away from lens 120. Polychromatic or white light radiation 160 is provided through one of the diffraction orders of diffraction grating 110 in the form of a single beam of radiation wavelengths $\lambda_1$, $\lambda_2$ and $\lambda_3$. Also, polychromatic or white light radiation 160 can be provided through mirror 130 in the form of co-parallel beams.

Pump means 140 produces beamlets 170, 180 and 190 which are focused simultaneously onto active medium portions 175, 185 and 195, respectively, so as to effect electron population inversion therein. Pump means 140 includes a pump laser, such an excimer, nitrogen, solid state, or copper-vapor laser. See, *Laser Guidebook*, by Jeff Hecht, McGraw Hill, New York (1992). More specifically, it is contemplated that beamlets 170, 180 and 190 may be generated from a single laser or from multiple lasers. In the case where a single laser is used, any well known optical beam splitter systems may be used to divide the single beam into the number of desired beamlets. Moreover, the single laser beam may be divided into several beamlets through the use of an acousto-optic deflector or a system of mirrors or prisms, as disclosed in our co-pending U.S. patent application, entitled "A Device For Pumping The Active Medium of A White Light Laser."

Figure 3:
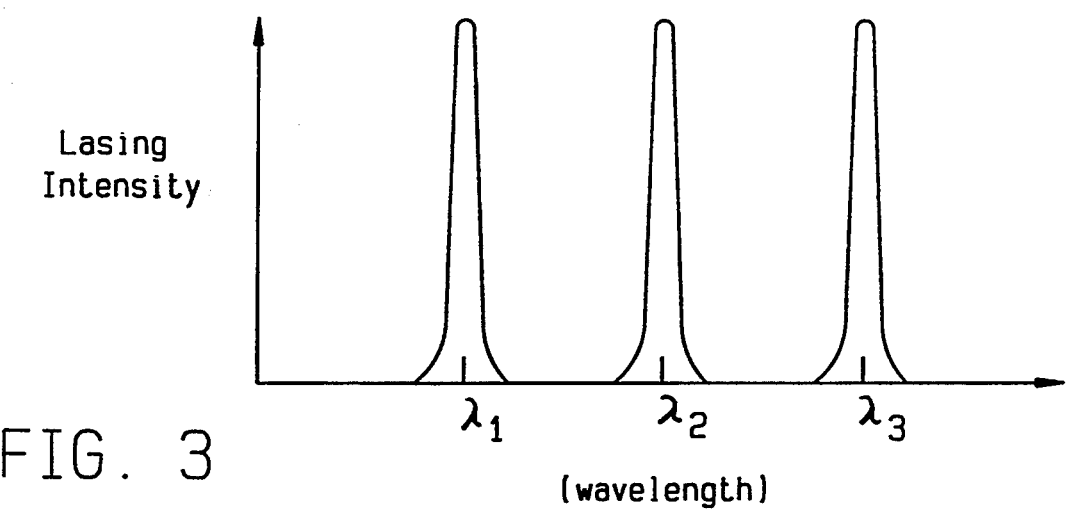
FIG. 3 is a graph of one illustrative lasing spectrum obtained with the polychromatic or white light laser of FIG. 1.

As discussed in more detail below, active medium portions 175, 185, 195 give rise to radiation at discrete wavelengths, $\lambda_1$, $\lambda_2$, and $\lambda_3$, respectively. For this first embodiment, an illustrative wavelength spectrum for white light radiation 160 is show in FIG. 3. Importantly, each of these spectral components can be independently tuned. Furthermore, it should be understood that the number of spectral components can be increased by simultaneously pumping other portions of the active medium.

Preferably, active medium 150 is any of the well known liquid dye solutions that are capable of broad spontaneous emission in the wavelengths of interest, namely $\lambda_1$, $\lambda_2$ and $\lambda_3$. For example, the dye solution may be in a polymer matrix or in a porous glass. See, *Laser Guidebook*, Jeff Hecht, McGraw-Hill, New York (1992). Also, solid state mediums with color centers, such as $LiF:F_2^+$, $LiF:F_2^-$, $LiF:F_3^+$ and $Al_2O_3:Ti_3^+$, can be used as the active medium.

Figure 4:
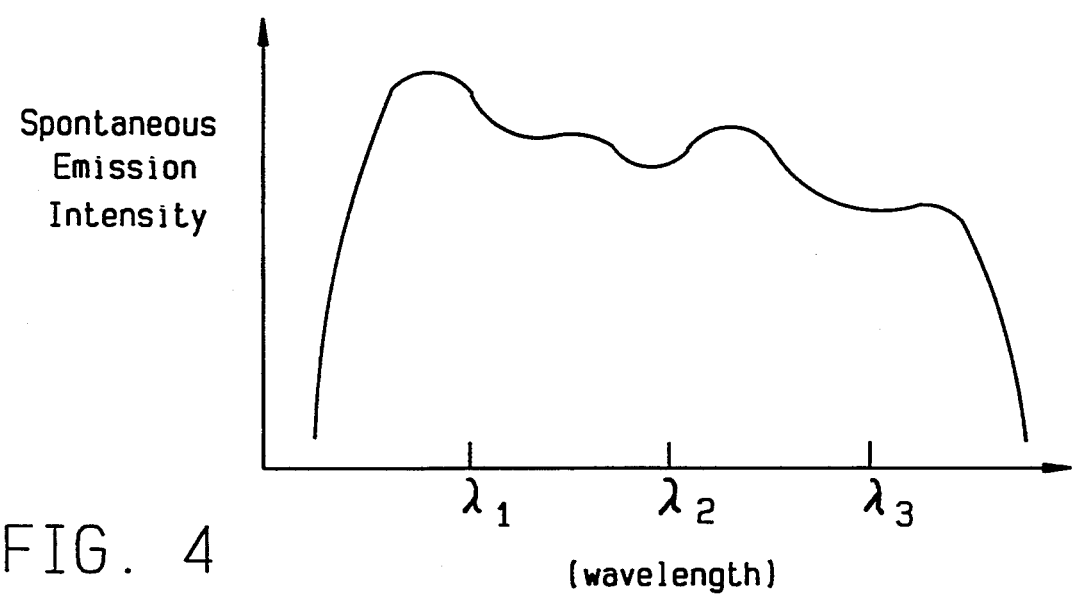
FIG. 4 is a characteristic graph showing the fluorescence spectrum of a dye solution.
Figure 5:
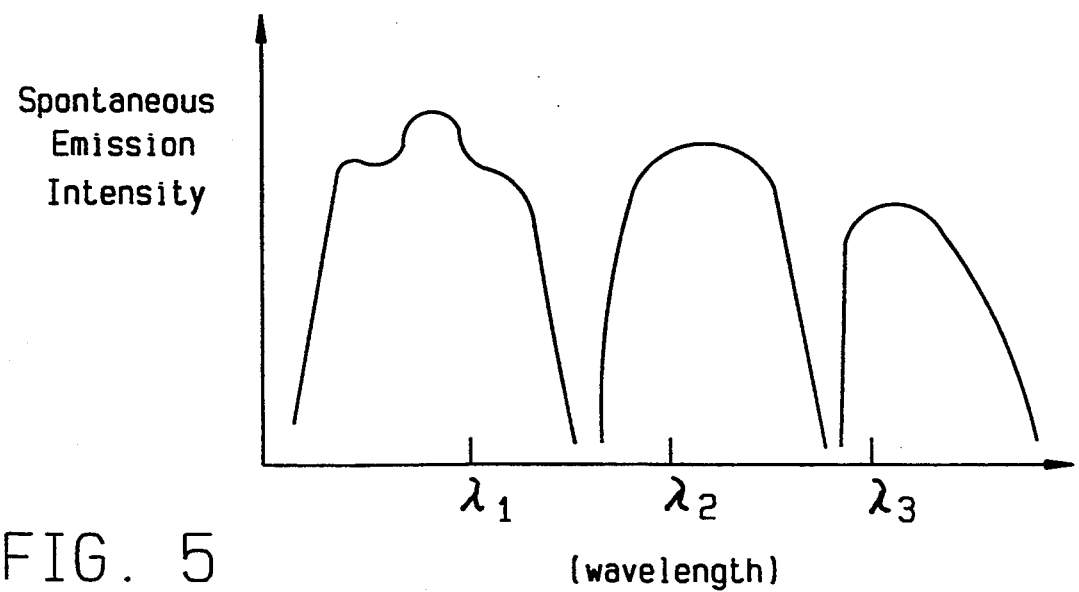
FIG. 5 is a characteristic graph showing the fluorescence spectra of multiple dye solutions.

The spontaneous emission spectrum of the active medium preferably has such characteristics as shown in FIG. 4. Moreover, active medium 150 may contain one or more adjacent dye cells, each containing the appropriate dye solution for a different wavelength spectrum of interest. The cell boundaries are shown by dashed lines in FIGS. 1 and 2. Typical emission spectra of a multi-compartment dye cell are shown in FIG. 5.

Referring to FIG. 2, diffraction grating 110 is operated in a Littrow or auto-collimation configuration. That is, for radiation at a wavelength $\lambda$ and an angle of incidence $\phi$ between the radiation and the normal to the surface of diffraction grating 110, radiation is reflected back along the propagation axis of the incident radiation. Diffraction grating 110 is adjustably tiltable about an axis perpendicular to the propagation axis of white light radiation 160 to effect the Littrow or auto-collimation configuration.

For a Littrow or auto-collimation configuration, the relationship between the wavelength and the angle of incidence is given by:

$$\mathrm{Sin}\phi = \frac{K\lambda}{2d} \qquad (1)$$

where K is the diffraction order, and d is the period of the diffraction grating.

In operation, polychromatic or white light radiation is realized by simultaneously pumping active medium 150 at different portions, each portion located at a different distance from optical axis 165 along the dispersive axis of diffraction grating 110. Preferably, since the focal plane of the focusing lens typically used to direct the beamlets onto the active medium is not flat due to aberrations, a matching plate is also employed (not shown) for conforming the boundary interface of the active medium with the shape of the focal surface of the lens. For a detailed discussion on the operation of the matching plate, see applicants' co-pending U.S. patent application, entitled "Controlled Spectrum Generation Laser."

In general, spontaneous emission from each pumped portion of active medium 150 is directed onto diffraction grating 110. Diffraction grating 110 diffracts the broadband spectrum radiation into their component wavelengths, each component propagating at a unique angle, $\Psi$, which is dependent on its wavelength in accordance with the well known diffraction grating equation. See, *Principles of Optics* by Born and Wolf, Pergamon Press, New York (1975). For radiation incident on diffraction grating 110, only one wavelength component will be reflected back along the propagation direction of the incident radiation onto the corresponding pumped portion of active medium 150. This radiation is amplified and directed onto the surface of mirror 130. Mirror 130 redirects the radiation back through the optical cavity, resulting in lasing at a number of predetermined and independently tunable wavelengths.

In order to better understand the operation of white light laser 100, illustrative optical paths for intracavity radiation are depicted in FIG. 2. Consider radiation from active medium portions 175, 185 and 195 located distances $X_1$, $X_2$ and $X_3$, respectively, away from optical axis 165. Radiation from portions 175, 185 and 195 are co-incident in point B of diffraction grating 110 at angles $\phi_1$, $\phi_2$ and $\phi_3$, respectively. In general, the angle of incidence is given by:

$$\phi = \theta - \tan^{-1}\left(\frac{X}{F}\right) \qquad (2)$$

where X is the distance from the optical axis, F is the focal length of lens 120, and $\theta$ is the angle between the normal to the surface of diffraction grating 110 and optical axis 165.

For a Littrow or auto-collimation configuration, the wavelengths $\lambda_1$, $\lambda_2$ and $\lambda_3$ of the radiation diffracted back from portions 175, 185 and 195, respectively, are given by:

$$\lambda_1 = \frac{2d \sin\phi_1}{K_{fb}} \quad (3)$$

$$\lambda_2 = \frac{2d \sin\phi_2}{K_{fb}} \quad (4)$$

$$\lambda_3 = \frac{2d \sin\phi_3}{K_{fb}} \quad (5)$$

where $K_{fb}$ is the diffraction order of the optical feedback radiation. In general, subscripts 1-3 may be replaced by i to indicate the $i^{th}$ wavelength or spectral component. Thus, although spontaneous emission from each of points 175, 185 and 195 is polychromatic, positive feedback within the cavity occurs only for radiation at the unique wavelengths $\lambda_1$, $\lambda_2$ and $\lambda_3$, respectively, given by equations 3-5.

Polychromatic or white light radiation 160 exists through one of the diffraction orders of diffraction grating 110 in accordance with the general diffraction grating equation:

$$\sin\psi_i = \frac{K_{out} \lambda_i}{d} - \sin\phi_i \quad (6)$$

where $\psi_i$ is the diffraction angle of the output radiation; $\lambda_i$ is the $i^{th}$ wavelength component of the output radiation; and $K_{out}$ is the diffraction order of the output radiation.

To ensure that each spectral component of white light radiation 160 egresses with the same angle of diffraction from diffraction grating 110 to form co-linear radiation 160, the angle of diffraction $\psi_i$ of the diffracted radiation must be independent of wavelength. This can be achieved by setting $K_{out}\lambda_i/d$ equal to $\sin\phi_i$ so as to remove any dependency on wavelength. Now, substituting the general expression for $\sin\phi_i$ into equation (6) yields the relationship between the feedback diffraction order, $K_{fb}$, and the output diffraction order, $K_{out}$:

$$K_{out} = \frac{K_{fb}}{2} \quad (7)$$

It should be clear from equation (6) that each spectral component of white light radiation 160 is diffracted from diffraction grating 110 normal to the surface thereof because the sin of $\psi_i$ equals zero.

Accordingly, to realize white light radiation 160 in the optical cavity depicted in FIGS. 1-2, the diffraction order for the feedback radiation must be chosen to be twice the diffraction order of the output diffraction radiation.

In accordance with equations 2-5, because the wavelengths of the spectral components of white light radiation 160 are dependent on the distance from the optical axis, the desired spectral components can be appropriately chosen by varying the spatial locations or coordinates of the pumped portions. This spectral dependency is given by:

$$\frac{dX}{d\lambda} = \left[ \frac{K}{2d \cos\phi} F\left(1 + \frac{X^2}{F^2}\right) + \frac{X}{F} \frac{dF}{d\lambda} \right] \quad (8)$$

For small angles $\phi$, this dependency is approximately linear.

Those skilled in the art will note that a basic feature of this white light laser is that it provides distinct regions, such active medium portions 175, 185 and 195, where positive feedback at different wavelengths is spatially resolved and non-overlapping. The forced oscillation at different portions of the active medium substantially eliminates wavelength coupling effects arising from non-linear effects, collisional coupling or transition homogeneous broadening. Advantageously, it should also be noted that for the optical cavity configuration of FIGS. 1-2 the optical path through the active medium for each wavelength is of equal path length.

Another advantage of the white light laser depicted in FIGS. 1-2 is that the intensity of each spectral component of the white light radiation can be easily adjusted for the desired application. The intensity of each pump beamlet associated with active medium portions 175, 185 and 195 may be adjusted by placing an active modulator, transmissive plate or partially reflective plate in the path between the pump beamlets and the active medium. Limiting the relative intensity of each pump beamlet, in turns, limits the intensity of each spectral component of the white light radiation.

It should be understood that the above equations regarding the conditions for forced oscillation or positive feedback are applicable for any point on the active medium that is located a distance X away from the optical axis. As such, it should be clear that it is possible to pump extended segments or a continuous extended segment of the active medium to achieve broadband lasing. For example, pumping different segments of active medium 150 rather than discrete portions gives rise to white light radiation comprising segments of a continuous spectrum.

Figure 6:
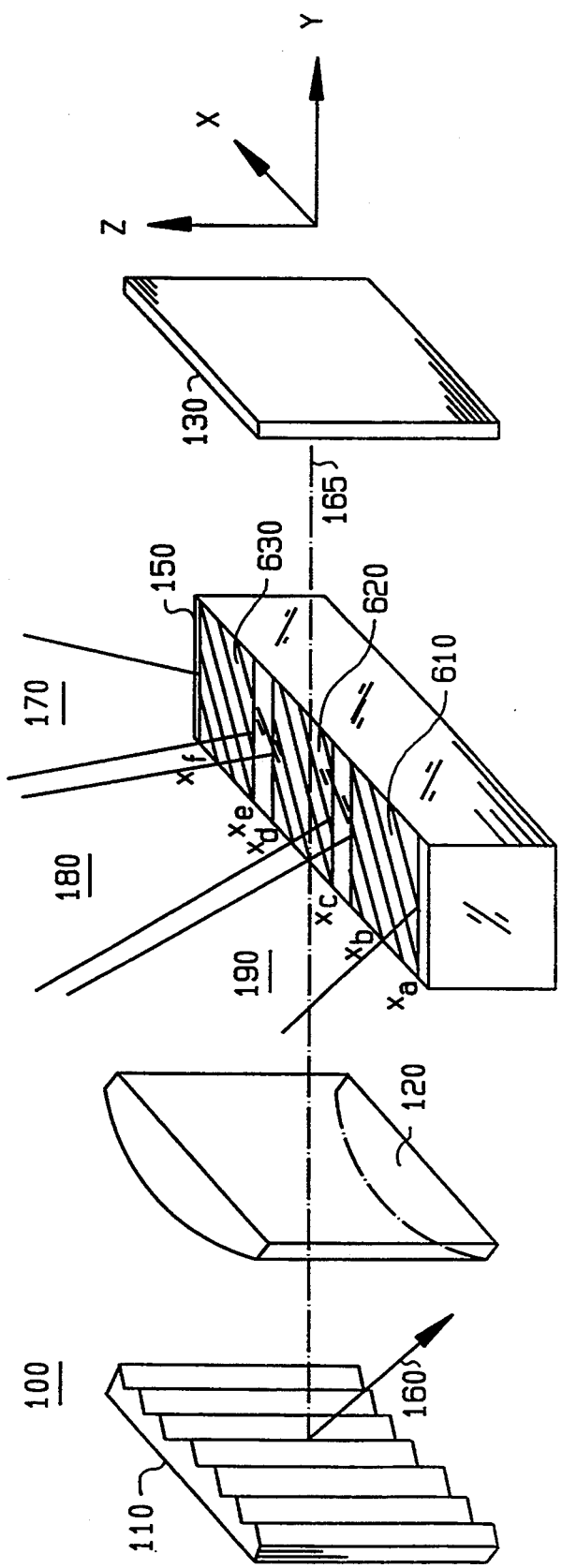
FIG. 6 is a schematic plan of the first embodiment of the polychromatic or white light laser having extended segments of the active medium pumped.
Figure 7:
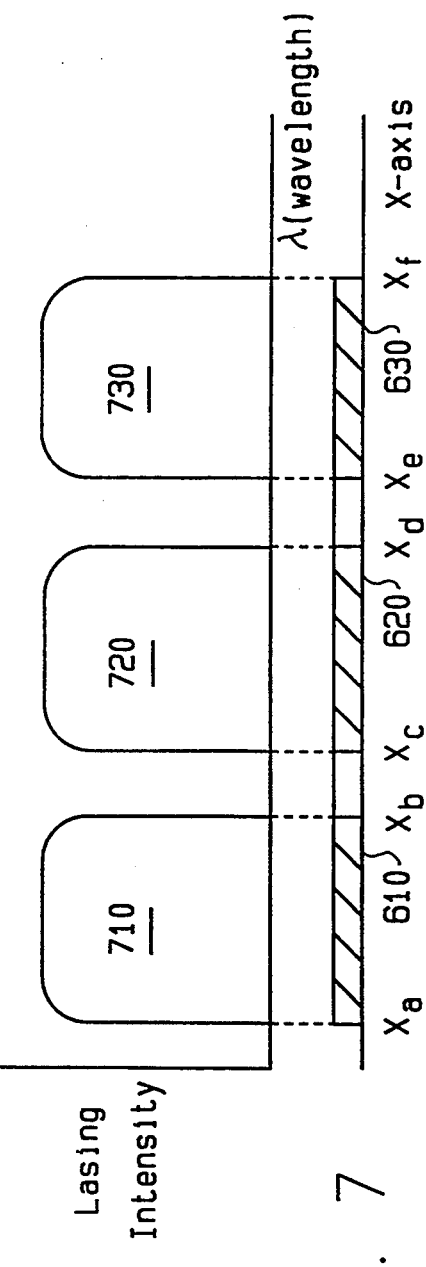
FIG. 7 is a graph showing the lasing spectrum of the polychromatic or white light laser of FIG. 6 when extended segments of the active medium are pumped.

Shown in FIG. 6 is active medium 150 being pumped at different segments 610, 620 and 630, with the characteristic lasing spectrum being illustrated in FIG. 7. Spectral segments 710, 720 and 730 correspond to the white light radiation generated from pump segments 610, 620 and 630, respectively, as noted by the X-axis placed underneath the horizontal wavelength axis of the lasing spectrum.

Figure 8:
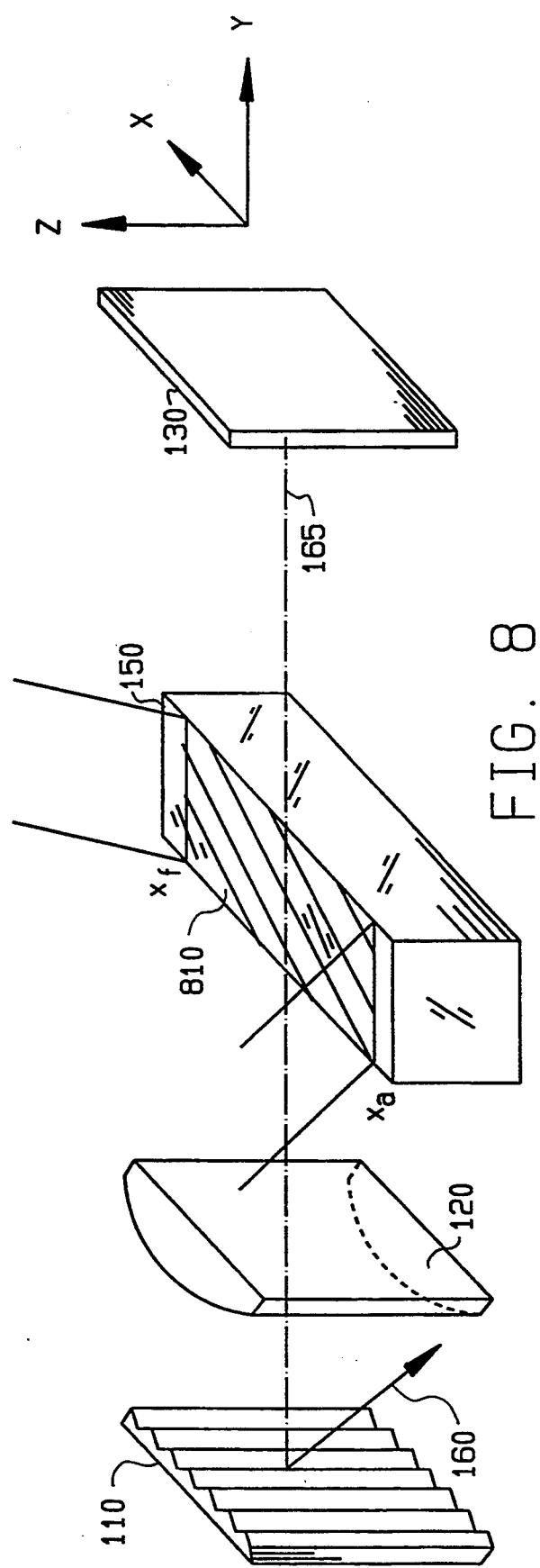
FIG. 8 is a schematic plan view of the first embodiment of the polychromatic or white light laser having a continuous extended segment of the active medium pumped.
Figure 9:
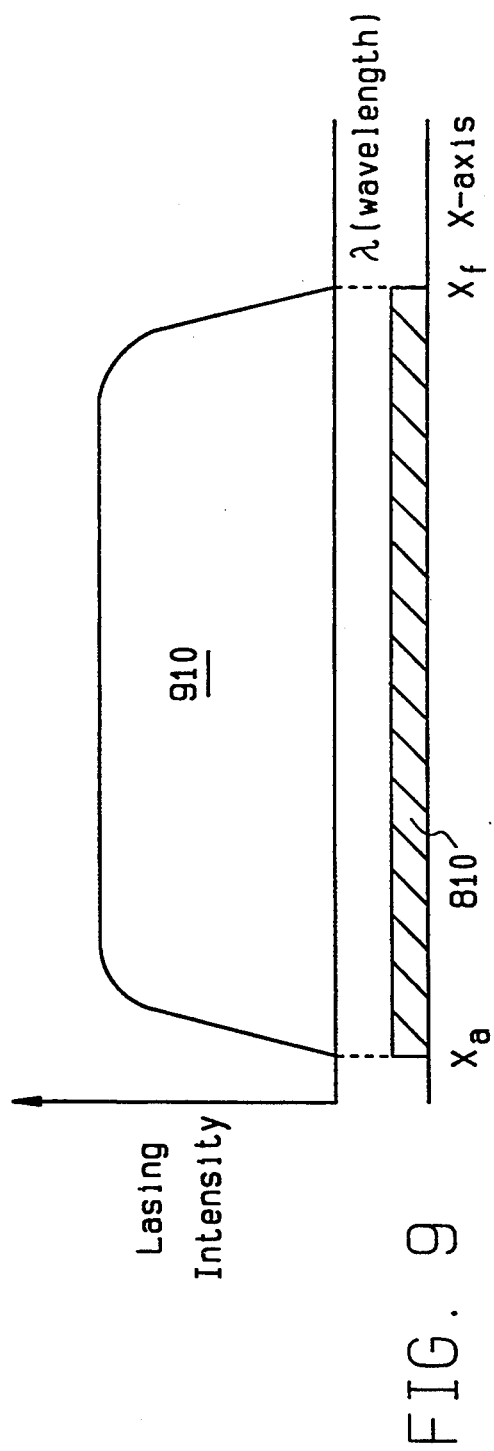
FIG. 9 is a graph showing the lasing spectrum of the polychromatic or white light laser of FIG. 8 when a continuous extended segment of the active medium is pumped.

Now referring to FIG. 8, there active medium 150 is illustrated as being pumped along a continuous portion 810, giving rise to white light radiation of a continuous spectrum 910. For this pump configuration, the characteristic lasing spectrum is illustrated in FIG. 9.

Figure 10:
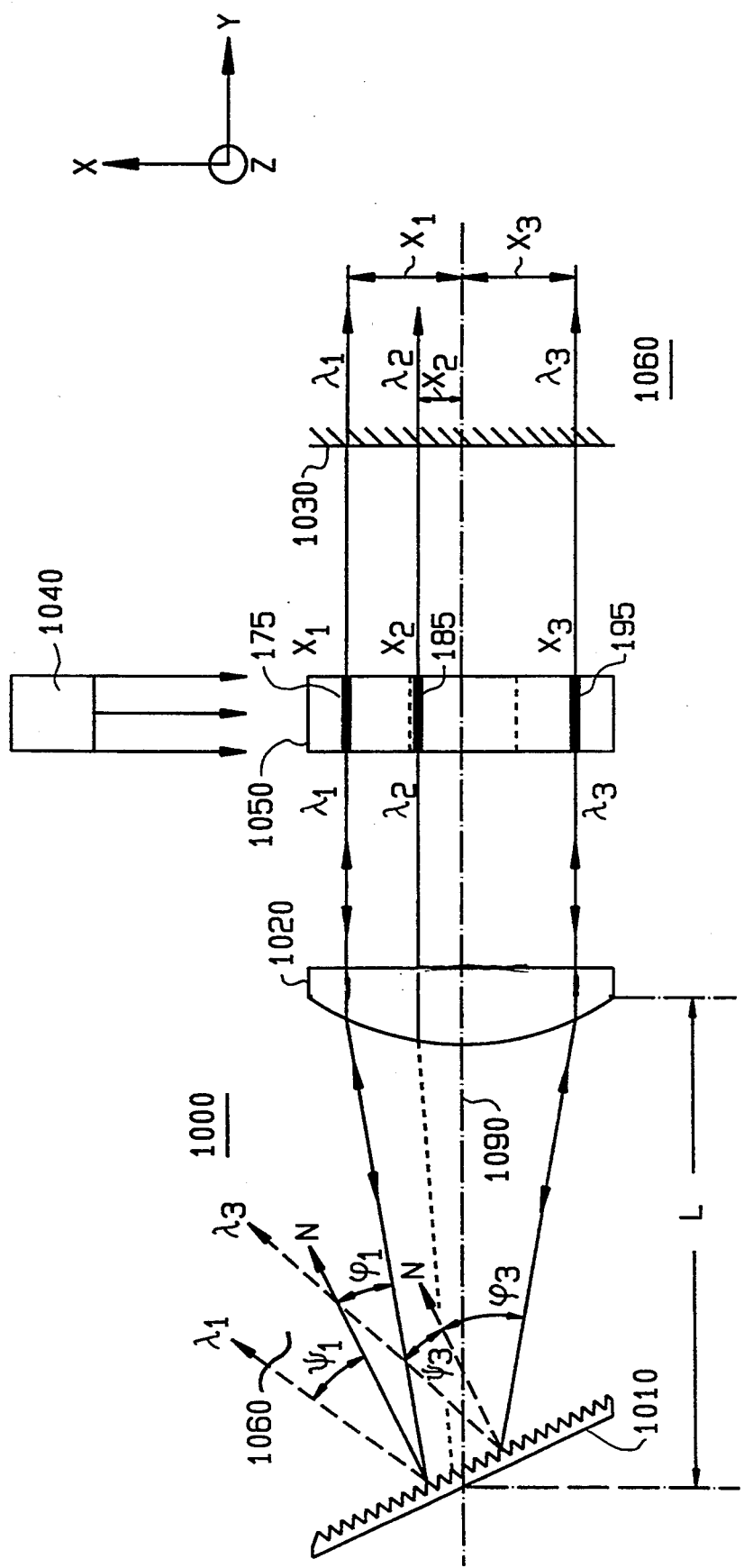
FIG. 10 is a schematic plan of a second embodiment of a polychromatic or white light laser in accordance with present invention.
Figure 11:
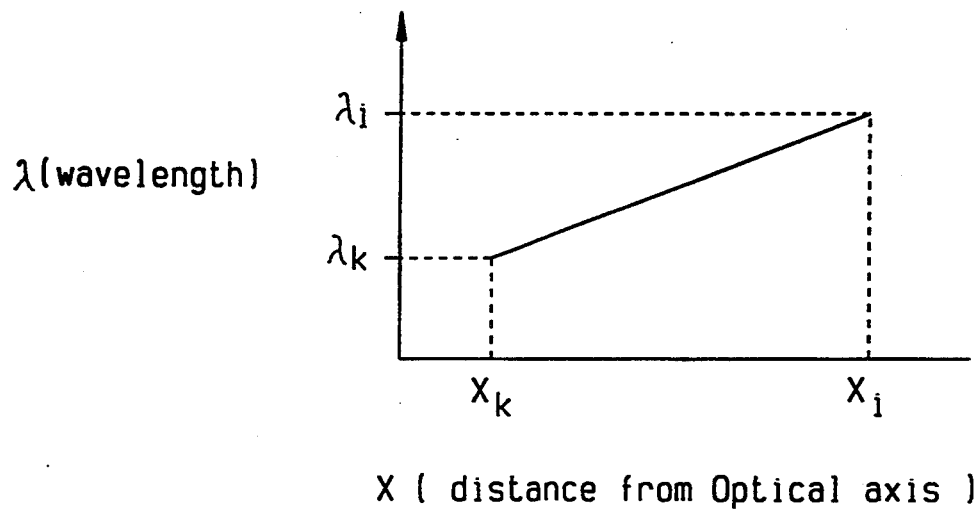
FIG. 11 is a graph of the relationship between the lasing wavelength and the spatial coordinate of the pumped portion of the active medium for the polychromatic or white light laser of FIG. 10.

Referring now to FIG. 10, there is illustrated a second embodiment of the present invention, in which the spectral components of the white light radiation 1060 are extracted from the optical cavity in the form of spatially separated parallel beams. Similarly, white light laser 1000 comprises a diffraction grating 1010, cylindrical lens 1020, partially reflecting mirror 1030, pump means 1040 and active medium 1050. Active medium 1050 is disposed between lens 1020 and partially reflecting mirror 1030. Mirror 1030 may be either planar, convex or concave. White light radiation 1060 is either provided by way of mirror 1030 or by one of the diffraction orders of diffraction grating 1010, such as the first order, in the form of a radiation having spatially separated spectral components. These spectral components may be tuned by adjusting the spatial coordinate, X, of the pumped portion of the active medium as illustrated in FIG. 11.

Pump means 1040 produces extended beamlets which are focused onto portions 175, 185 and 195 of active medium 1050 at spatial positions $X_1$, $X_2$ and $X_3$, respectively, to effect spontaneous emission along the entire width of the irradiated portions of active medium 1050. Diffraction grating 1010 is operated in an auto-collimation configuration. Now, consider radiation from a portion on active medium 1050 located the distance $X_3$ from optical axis 1090. Positive feedback or forced oscillation is only satisfied for radiation at a wavelength $\lambda_3$ given by:

$$\lambda_3 = \frac{2d \sin\phi_3}{K} \quad (9)$$

where K is the diffraction grating order, $\phi_3$ is the angle of incidence of the radiation on diffraction grating 1010, and d is the period of diffraction grating 1010.

Now consider radiation from a second portion on active medium 1050 located the distance $X_1$ from optical axis 1090. Similarly, positive feedback is only satisfied for radiation at a wavelength $\lambda_1$ given by:

$$\lambda_1 = \frac{2d \sin\phi_1}{K} \quad (10)$$

where $\phi_1$ is the angle of incidence of radiation on diffraction grating 1010 from point $X_1$.

Consider now any other radiation from active medium 1050 located at an intermediate distance X ($X_3 < X < X_1$) from optical axis 1090 incident on diffraction grating 1010. It can be shown that the wavelength radiation that satisfies the resonant condition lies between $\lambda_3$ and $\lambda_1$. Because the angle of incidence $\phi$ on diffraction grating 1010 is linearly dependent for small angles on the spatial location, X, white light radiation 1060 comprises spatially separated radiation wavelengths that linearly vary from $\lambda_1$ to $\lambda_3$ with the spatial location of the pumped portion of active medium 1050.

Advantageously, the embodiment of FIG. 10 substantially eliminates wavelength coupling between different portions of the active medium because diffraction grating 1010 is not placed at the focal length of lens 1020. As such, mode competition between different lasing wavelengths is minimized.

An advantage of the white laser configuration depicted in FIG. 10 is that it provides the capability of controlling the spectrum of the white light radiation by adjusting the focal length of intracavity lens 1020. If $\lambda_1$ and $\lambda_2$ are the desired minimum and maximum radiation wavelengths desired within the white light radiation, then the angular separation $\Gamma_{12}$ between them is given by:

$$\Gamma_{12} = \int_{\lambda_1}^{\lambda_2} D_\phi d\lambda \quad (11)$$

where $D_{100} = d\phi/dX$ is the angular dispersion of diffraction grating 1010. For the desired spectral range, $\lambda_1$ to $\lambda_2$, the focal length, F, of intracavity lens 1020 can be shown to be given by:

$$|F| \leq \frac{S - \sin\Gamma_{12}}{2(1 - \cos\Gamma_{12})} \quad (12)$$

where S is the size of the smallest intracavity element along the direction of the axis of dispersion. Referring to FIG. 10, S is typically the length of the intracavity lens along the X-axis. Moreover, the distance $X_i$ from optical axis 1090 required to generate radiation at a wavelength $\lambda_i$ is given by:

$$X_i = F \tan \int_{\lambda_0}^{\lambda_i} D_\phi d\lambda \quad (13)$$

$$\lambda_i = \lambda_o + \frac{X_i}{D_\phi F} \quad (14)$$

where $\lambda_o$ is the radiation wavelength corresponding to the portion of active medium 1050 located on optical axis 1090.

Figure 12:
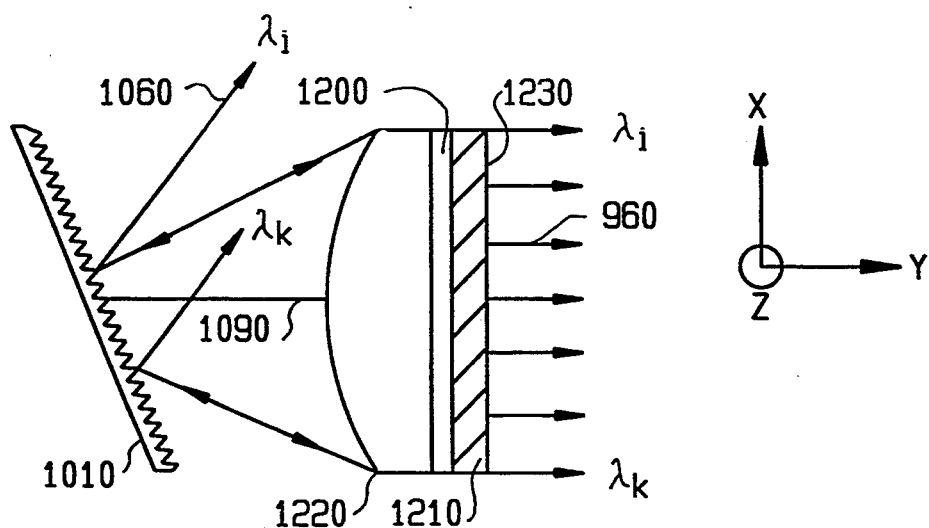
FIG. 12 is an illustration of the polychromatic or white light laser of FIG. 10 with the intracavity lens and mirror integrated with the active medium.

Although in the above embodiments the intracavity lens and mirror are located a distance away from the active medium, it is contemplated that the lens and/or the mirror may be integrated with the active medium, such as with a dye cell. For example, referring to FIG. 12, there is shown a dye cell 1200 fabricated with one lateral side made in the form of lens 1220, either cylindrical, concave or convex. The other lateral side of dye cell 1200 can be made in the form of a plate 1210 having a reflective coating 1230 disposed thereon to act as the mirror. By integrating the intracavity lens and mirror with the active medium, it is possible to simplify the construction of the optical cavity. Moreover, the intracavity loss is minimized because there are less surfaces from which reflections can occur.

Additionally, a diffraction grating having a variable blazing angle may be used in the above embodiments so as to increase the optical power output. In general, the reflectivity of a diffraction grating gradually decreases for wavelengths away from the wavelength for which the blazing angle has been optimized. This diminution while relatively minor for the first diffraction order is significant for the higher diffraction orders and greatly reduces the optical power output. By adjusting the blazing angle along the dispersive axis of the diffraction grating so as to be optimized for the wavelength of the feedback radiation associated therewith, it is possible to enhance the optical power output.

Preferably, a cylindrical lens should be employed when using a variable blazing angle diffraction grating because it is generally not necessary to change the incident angle of the radiation in the plane perpendicular to the axis of dispersion. Calculations indicate that the optical power output can increase between 20 to 300% with such a variable blazing angle diffraction grating.

Figure 13:
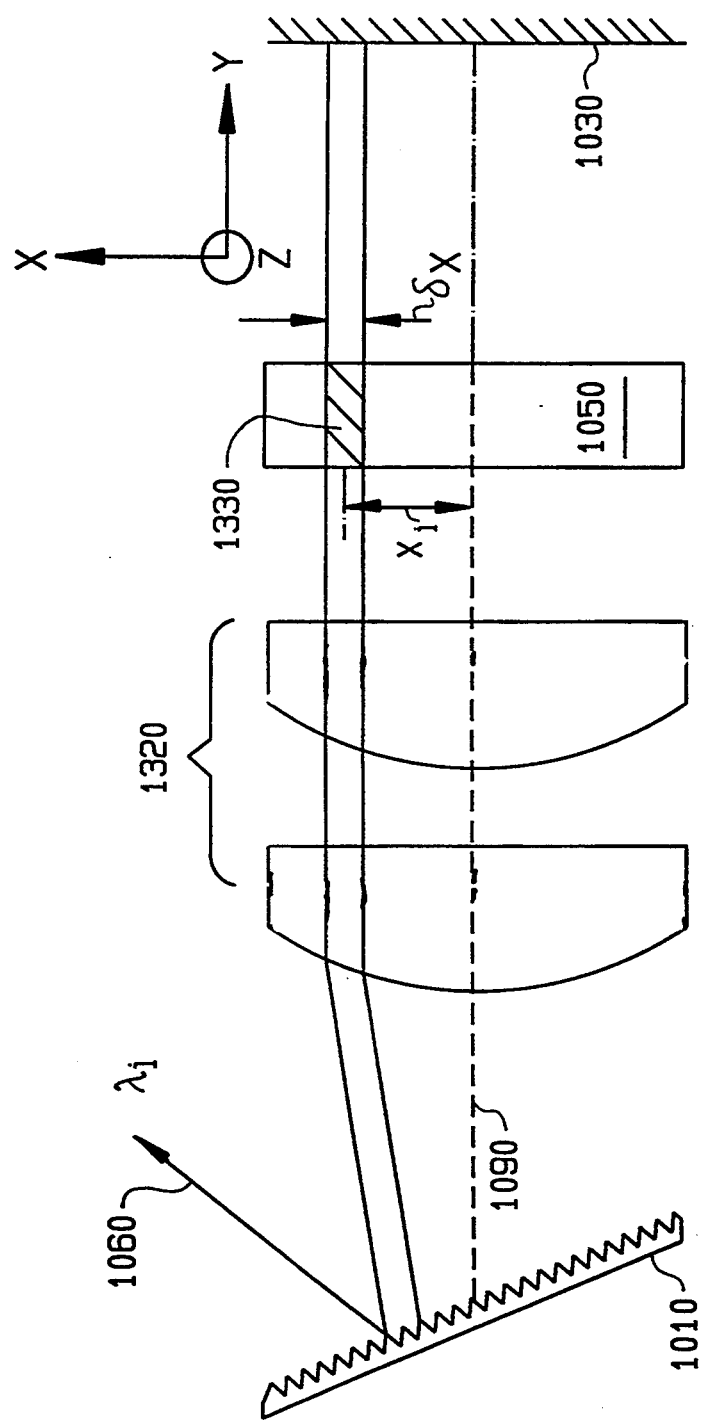
FIG. 13 is a schematic plan of a third embodiment of a polychromatic or white light laser with a variable focal length intracavity lens.

Referring now to FIG. 13, there is illustrated a third embodiment of the present invention which is similar to the second embodiment and in which numeral 1320 denotes a variable focal length lens used to vary the linewidth of the spectral components or the bandwidth of white light radiation 1060. For the sake of clarity, only one spectral component is shown in FIG. 13. For a discussion on the design and operation of variable focal length lenses, see, for example, *Lens Design Fundamental*, Rudolf Kingslake, Academic Press, New York (1978). The lasing linewidth, $\delta\lambda$, for a discrete wavelength component can be shown to be given by:

$$\delta\lambda = D_\phi \frac{\delta X}{F\left(1 + \frac{X_i^2}{F^2}\right)} \quad (15)$$

$$\lambda_i = \lambda_o + \frac{X_i}{D_\phi F} \quad (16)$$

where $\delta X$ is the size of pumped portion 1330, F is the focal length of lens 1320, and $X_i$ is the distance of pumped portion 1330 from optical axis 1090.

In the white light laser constructed as shown in FIG. 13, it is possible to change the linewidth, $\delta\lambda$, without changing the size of the pumped portion of the active medium. Although the linewidth can be adjusted by varying the size of the pump beam incident on the active medium, the range is limited because the pump beam must still be sufficiently small so that the optical power density is high enough to effect lasing. Also in some instances it is impractical to adjust the size of the pumped portion of the active medium because there is no mechanism to de-focus the pump beam. Accordingly, this third embodiment advantageously affords the ability to adjust the linewidth over a large spectral range without de-focusing the pump beam.

It is contemplated, however, that the linewidth can be adjusted also by simultaneously adjusting the size of the pumped portion of the active medium and the focal length of the intracavity lens. For example, results from experimental practice indicate that with an intracavity lens having a variable focal length between 30-500 mm, it is possible to vary the linewidth up to 15 times greater than by solely adjusting the spot size of the pump beam.

Figure 14:
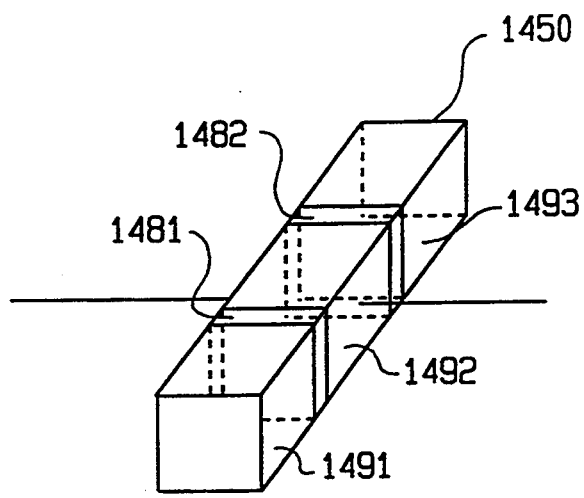
FIG. 14 is an illustration of a dye cell containing multiple cell compartments.

In the above embodiments, the desired wavelengths of interest are preferably covered by the fluorescence band of a particular dye. For some applications, however, it is desirable to provide tunable wavelengths over a wider band than that of a single dye. In those applications, an active medium 1450 comprises multiple cell compartments 1491, 1492, and 1493 of separate dye solutions, as shown in FIG. 14. Each dye solution, however, in practice is separated from another by a cell wall of a finite thickness, such as walls 1481 and 1482. It should be recalled that each wavelength component is uniquely mapped to the spatial coordinate of the active medium. With multiple cell compartments, there will unfortunately be gaps in the lasing spectrum corresponding to the width of each cell wall.

Figure 15:
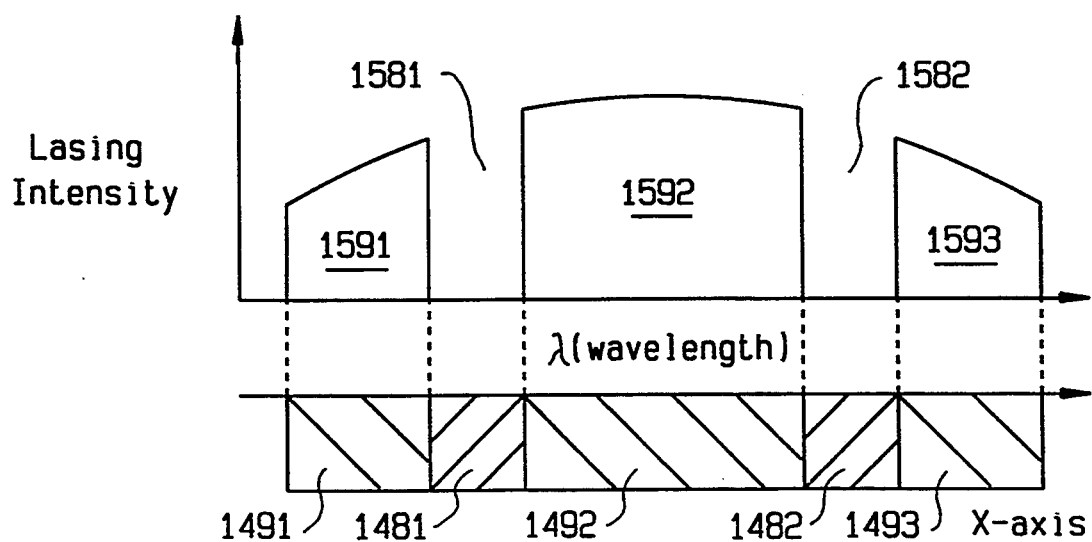
FIG. 15 is a graph of the characteristic spectrum of a polychromatic or white light laser having the dye cell of FIG. 14.

Shown in FIG. 15 is a characteristic spectrum of white light radiation generated from active medium 1450 comprising multiple cell compartments. Spectral gaps 1581 and 1582 correspond to the inability of cell boundary walls 1481 and 1482, respectively, to lase.

Figure 16:
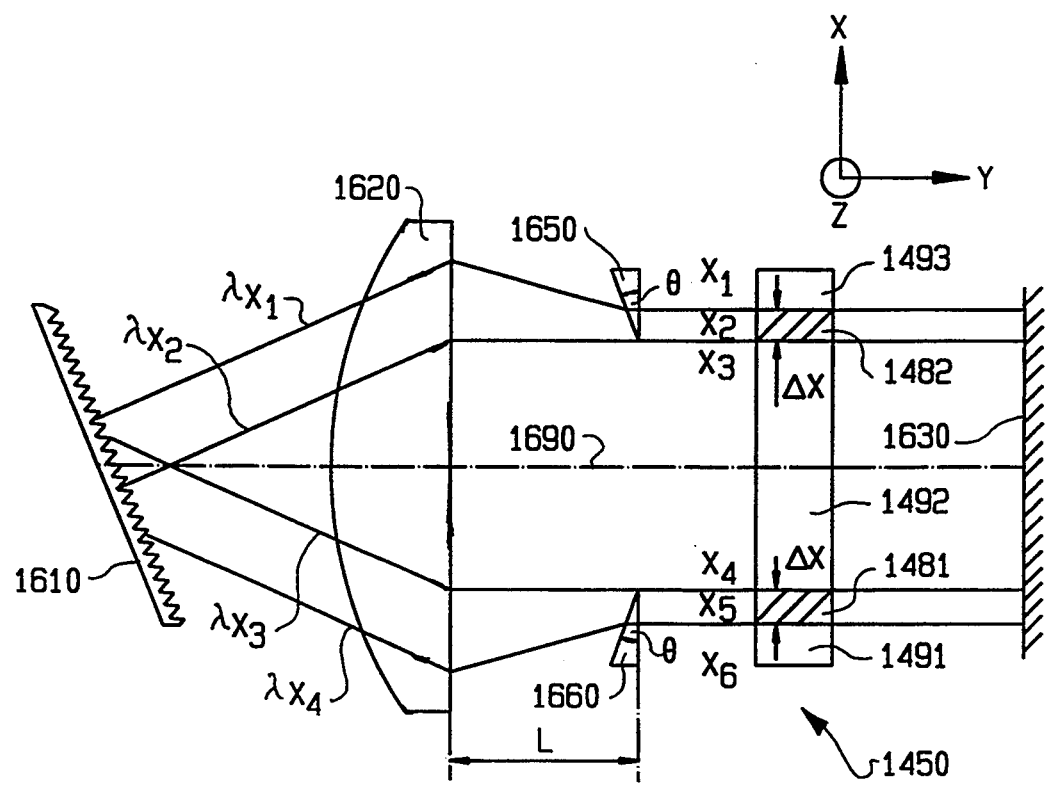
FIG. 16 a schematic plan of a fourth embodiment of a polychromatic or white light laser which utilizes a pair of prisms to compensate for the non-lasing portions of a multi-compartment dye cell.

Referring to FIG. 16, there is shown a fourth embodiment in which prisms are used to compensate for the non-lasing regions of active medium 1450, such as cell walls 1481 and 1482. Prisms 1650 and 1660 are disposed between active medium 1450 and intracavity lens 1620. Importantly, prism 1650 is also positioned so as to refract radiation from portions of active medium 1450 located adjacent to edges $X_2$ and $X_3$ such that the radiation fall on diffraction grating 1610 with the same angle of incidence. Those skilled in the art will note that radiation from portions between $X_1$ to $X_2$ are also refracted along the X-axis by prism 1650 to shift the spectral range associated therewith. Similarly, prism 1660 is positioned in the same manner with respect to edges $X_4$ and $X_5$.

Figure 17:
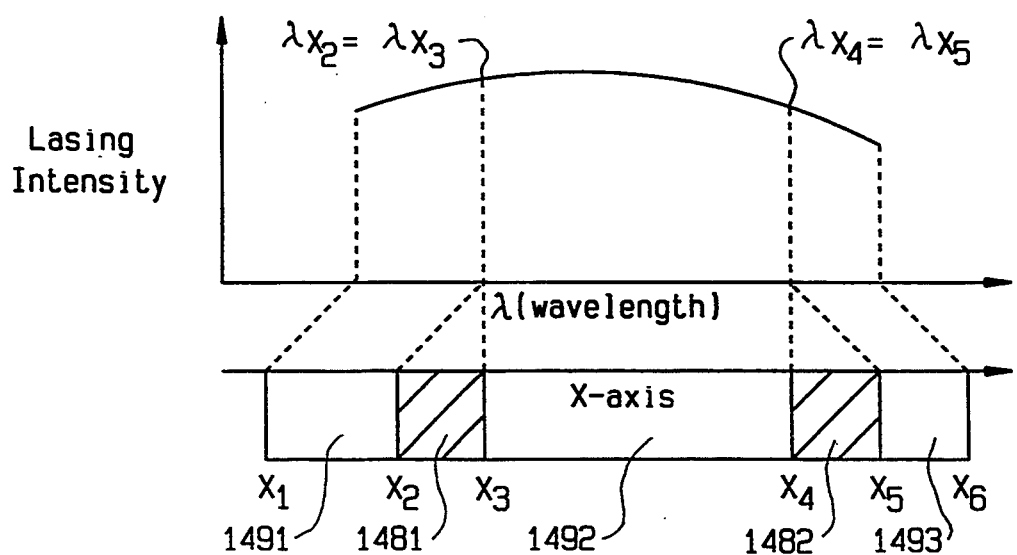
FIG. 17 is a graph of the characteristic spectrum of the polychromatic or white light laser of FIG. 16.

It should be recalled that the angle of incidence on the diffraction grating determines the wavelength of the feedback radiation and thus, the lasing wavelength of the corresponding spatial location of the active medium. By forcing the radiation from the edges of each cell wall to fall on the diffraction grating with the same incident angle, thus ensures that the radiation wavelength corresponding to the edges of each cell wall is the same. As such, the lasing spectrum as well as the spectral range of tunability is continuous and without spectral gaps. Shown in FIG. 17 is the characteristic lasing spectrum of white light radiation generated from this fourth embodiment.

It can be shown from paraxial ray calculations that the prism angle $\theta$ required to properly refract the radiation from the edges of the cell wall in the manner described above is given by:

$$\theta = \frac{\Delta X}{(F - L)(N - 1)} \quad (17)$$

where $\Delta X$ is the width of the cell wall, F is the focal length of lens 1620, N is the index of refraction of the prism and L is the distance between the prism and lens 1620.

It is to be understood that prisms 1650 and 1660 may also be fabricated as a single compensatory glass plate 1800, as shown in FIG. 18. The optical edges 1810 and 1820 of glass plate 1800 each functions as a prism, with the angle of each inclined surface 1830 and 1840 set in accordance with the width of the respective cell wall. Furthermore, it is contemplated that the prisms or compensatory glass plate may be advantageously integrated with the lateral side walls of the dye cell so as to obviate surface reflections, thereby increasing the optical efficiency of the cavity. FIGS. 19-20 illustrate exemplary integrations of the prisms and compensatory glass plate with the lateral walls of dye cell 1450, respectively.

Still further, compensatory plate 1800 may be fused or integrated with intracavity lens 1620 as illustrated in FIG. 21. Those skilled in the art will readily note that such an integration simplifies the optical alignment and increases the optical efficiency.

A specific embodiment which may be constructed to practice this fourth embodiment is now illustrated as follows. Diffraction grating 1610 is a holographic diffraction grating having a period of 1200 mm$^{-1}$; intracavity lens 1620 is a 150 mm cylindrical lens; and mirror 1630 is a dielectric mirror with a reflectivity of $\sim 0.7$ for the visible and near infra-red regions. Active medium 1450 consists of three adjacent dye cells, each separated by a 1 mm thick cell wall. Further, the first dye cell includes an ethanol solution of Rhodamine 6G and Oxazine 17; the second dye cell includes a solution of Coumarin 30; and the third dye cell includes a solution of Coumarin 47.

With this specific embodiment, the 1 mm thick cell walls each corresponds to a 200 Å spectral gap in the lasing spectrum. In accordance with the principles of the invention discussed above, prisms each having an angle $\theta$ of 2.3° were positioned between the 150 mm lens and the active medium so as to eliminate the 200Å spectral gaps, thereby forming a continuous lasing spectrum which ranged from the visible to the near infrared.

In the above embodiments, it should be understood that the intracavity lens may either be a spherical, sphere-cylindrical, bi-focal, or cylindrical lens. In general, the focal length of the lens in the plane parallel to the dispersive axis of the diffraction grating is chosen in accordance with the desired lasing spectrum. The focal length or power of the intracavity lens in the plane perpendicular to the dispersive axis of the diffraction grating, however, may be chosen in accordance with the desired spatial field distribution, e.g., $TEM_{00}$, $TEM_{01}$, etc.

In some applications, such as in holography, it is desirable to independently adjust the linewidth and the tunable spectral range for each spectral component of the polychromatic or white light radiation. However, both the linewidth $\delta\lambda$ and the spectral range of tunability $\Delta\lambda$ are inversely proportional to the focal length of the intracavity lens as follows:

$$\delta\lambda = \frac{\delta x}{D_\phi F} \quad (18)$$

$$\Delta\lambda = \frac{\Delta X}{D_\phi F} \quad (19)$$

where $\delta x$ is the spot size of the pump beam on the active medium, and $\Delta X$ is width of the active medium along the dispersive axis of the diffraction grating.

Thus, if the focal length F is increased to decrease the linewidth $\delta\lambda$ of one desired spectral component, the spectral range $\delta\lambda$ for all spectral components is also simultaneously decreased.

Figure 22:
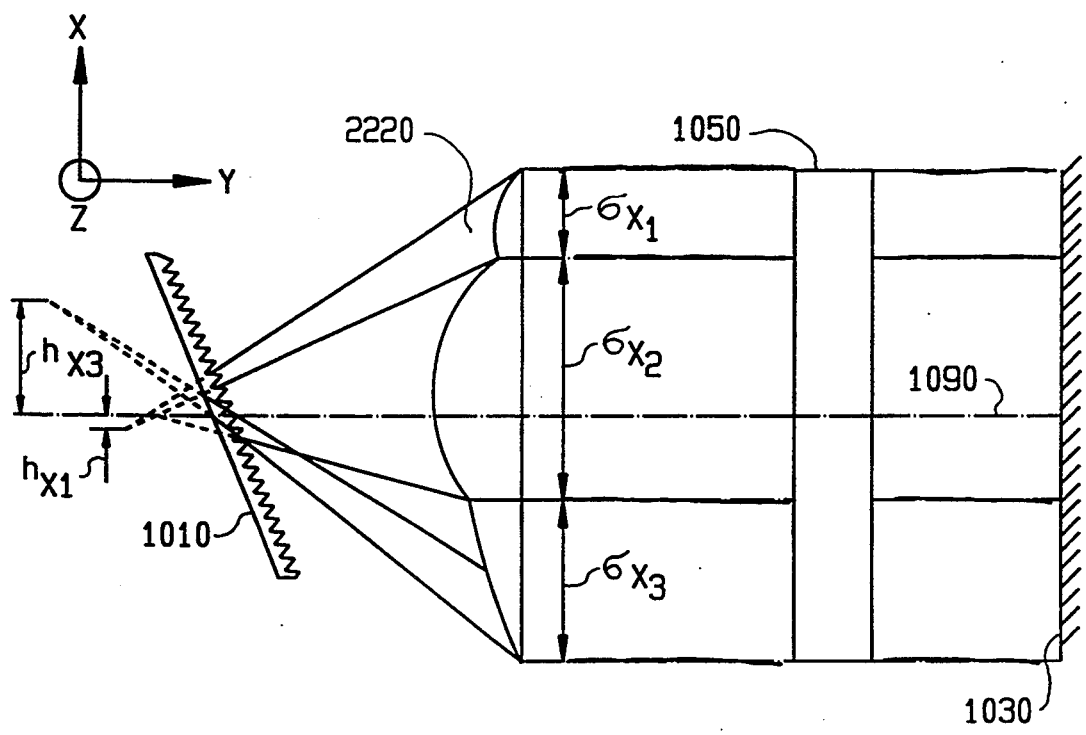
FIG. 22 is a schematic plan of a fifth embodiment of a polychromatic or white light laser with a multi-segmented intracavity lens.

Referring to FIG. 22, there is shown a fifth embodiment which is similar to that of FIG. 10 and in which element 2220 is a multi-segmented lens having portions $\sigma_{x1}$, $\sigma_{x2}$ and $\sigma_{x3}$. Lens portions $\sigma_{x1}$ and $\sigma_{x3}$ each have its center of curvature offset from optical axis 1090 along the dispersive axis of diffraction grating 1010. In this fifth embodiment, intracavity lens 2220 is advantageously used so as to allow the linewidth of one spectral component and the spectral range over which that spectral component is tunable to be adjusted independently of other spectral components. Each of lens portions $\sigma_{x1}$, $\sigma_{x2}$ and $\sigma_{x3}$ may have a different focal length depending on the desired linewidth. The width of each lens portions $\sigma_{x1}$, $\sigma_{x2}$ and $\sigma_{x3}$, moreover, is chosen in accordance with the desired spectral range $\Delta\lambda$ over which a desired spectral component is to be tuned. The width of each segment is given by $\Delta\lambda D_{100} F$.

It can be further shown that offsets $h_{x1}$ and $h_{x3}$ with respect to the focal points of lens portions $\sigma_{x1}$, and $\sigma_{x3}$, respectively, are dependent on the location of the center of curvature of the respective lens portions from optical axis 1090. This offset effectively shifts the tunable spectral range from each other and is given by the offset divided by $D_l$.

Figure 23:
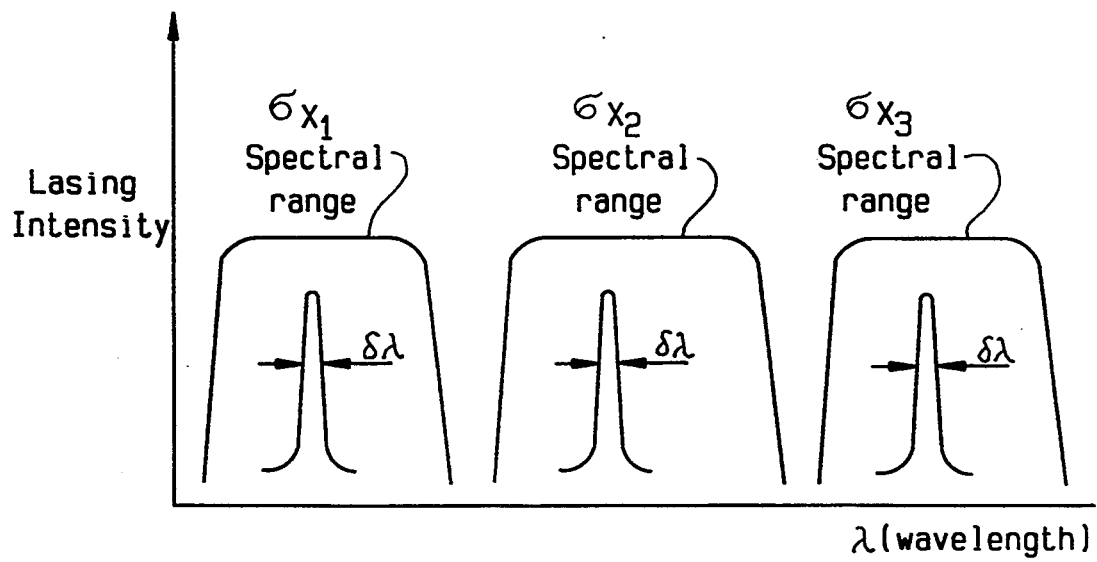
FIG. 23 is a graph of the characteristic spectrum of the polychromatic or white light laser of FIG. 22.

Shown in FIG. 23 is a characteristic lasing spectrum and range of spectral tunability for this fifth embodiment. It should be noted that for each lens portions, the linewidth and spectral range of tunability have been independently adjusted by appropriately choosing the focal length for each lens portions of intracavity lens 2200.

A specific embodiment which may be constructed to practice this fifth embodiment is now illustrated. Diffraction grating 1010 is a holographic diffraction grating having a period between 1200–2400 $mm^{-1}$; mirror 1030 is a dielectric mirror with a reflectivity of ~0.7 for the visible and near infra-red regions. Active medium 1050 consists of three adjacent dye cells, each containing a dye solution of, for example, an ethanol solution of Rhodamine 6G with Oxazine 17, Coumarin 153, and LD 425. Intracavity lens 2220 is made from portions 2410, 2430 and 2450 of a single 500 mm plano-convex cylindrical lens 2400 which has been divided into five portions, as shown in FIGS. 24 and 25.

With this specific embodiment, the linear dispersion $D_l$ is 0.66 mm per nm. Accordingly, each of the 20 mm length portions 2410, 2430 and 2450 has a corresponding spectral range of 30 nm over which a spectral component of the white light radiation can be tuned. Also each tunable spectral range is offset from the other by 105 nm. This is because the center of curvature for lens 2410 and 2450 is each offset from the optical axis by 70 mm, which resulted from the removal of lens portions 2420 and 2440. Shown in FIG. 26 are the spectral ranges associated with each of portions 2410, 2430 and 2450. Note that regions I, II and III correspond to portions 2410, 2430 and 2450, respectively. It should be understood that within regions I, II, and III tuning may be accomplished by adjusting the location where the pump beamlets are incident on the active medium, i.e., the spatial coordinates of the pumped portion.

Figure 27:
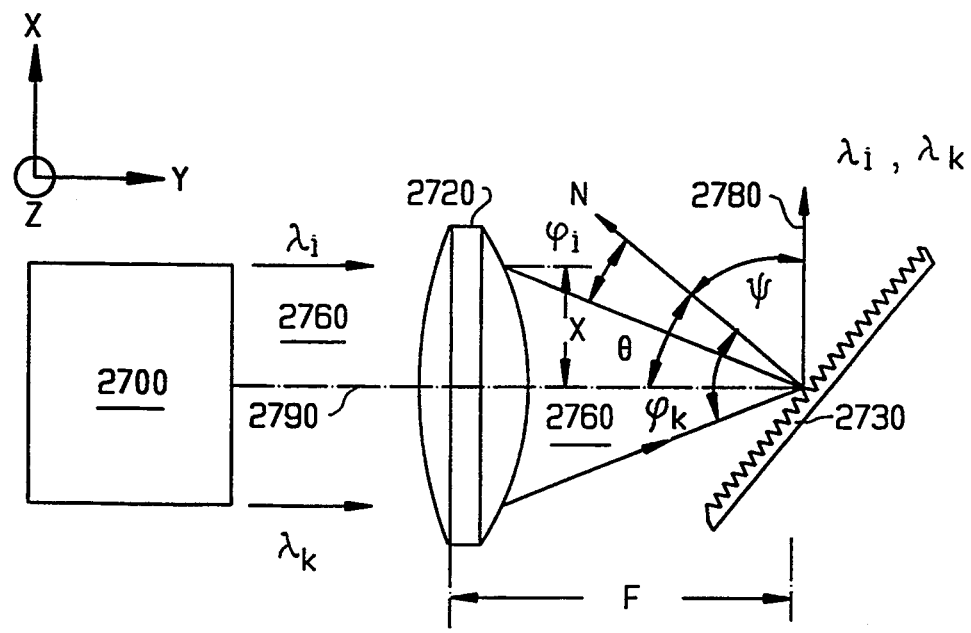
FIG. 27 is a schematic plan of a sixth embodiment of a polychromatic or white light laser in which an external dispersive element is used to generate co-linear polychromatic or white light radiation.

One disadvantage posed by the cavity configurations of embodiments 2–5 lies in that the polychromatic or white light radiation egresses spatially separated in space. In a sixth embodiment, an external diffraction grating, however, may be employed advantageously to unite the wavelength components into a single co-linear beam 2780, as shown in FIG. 27. According to this sixth embodiment, a polychromatic or white light laser 2700 similar to any one of embodiments 2–5 may be used. Notably, the spectral wavelength components of white light radiation 2760 are distributed along an axis perpendicular to the axis of propagation, as shown in FIG. 11. A lens 2720 is provided between white light laser 2700 and a diffraction grating 2730. Diffraction grating 2730 is placed a focal length, F, away from lens 2720.

White light radiation 2760 is diffracted by diffraction grating 2730 in accordance with the general diffraction equation:

$$\sin\phi + \sin\psi = \frac{K\lambda}{d} \quad (20)$$

where $\phi$ is the angle of incidence, $\Psi$ is the angle of diffraction with respect to the normal of the surface of the grating, and K is the diffraction order. To ensure that the diffracted radiation exits as co-linear radiation, we impose the restriction that $d\Psi/d\lambda$ is zero and calculate the angular dispersion, $D_{100} = d\phi/d\lambda$, by differentiating equation (20), treating $\phi$ and $\lambda$ as variables, to yield:

$$D_\phi = \frac{d\phi}{d\lambda} = \frac{K}{d\cos\phi} \quad (21)$$

Rearranging equation 21 we obtain that the linear dispersion is equal to:

$$D_l = D_\phi \cdot F = \frac{KF}{d\cos\phi} \quad (22)$$

where F is the focal length of lens 2720.

Accordingly, to unite the spectral components of the white light radiation into co-linear beam 2780 the focal length, F, of lens 2720 must be chosen such that the product of the angular dispersion, $D_{100}$ and the focal length, F, is equal to the linear dispersion, $D_l$ of the laser.

Figure 28:
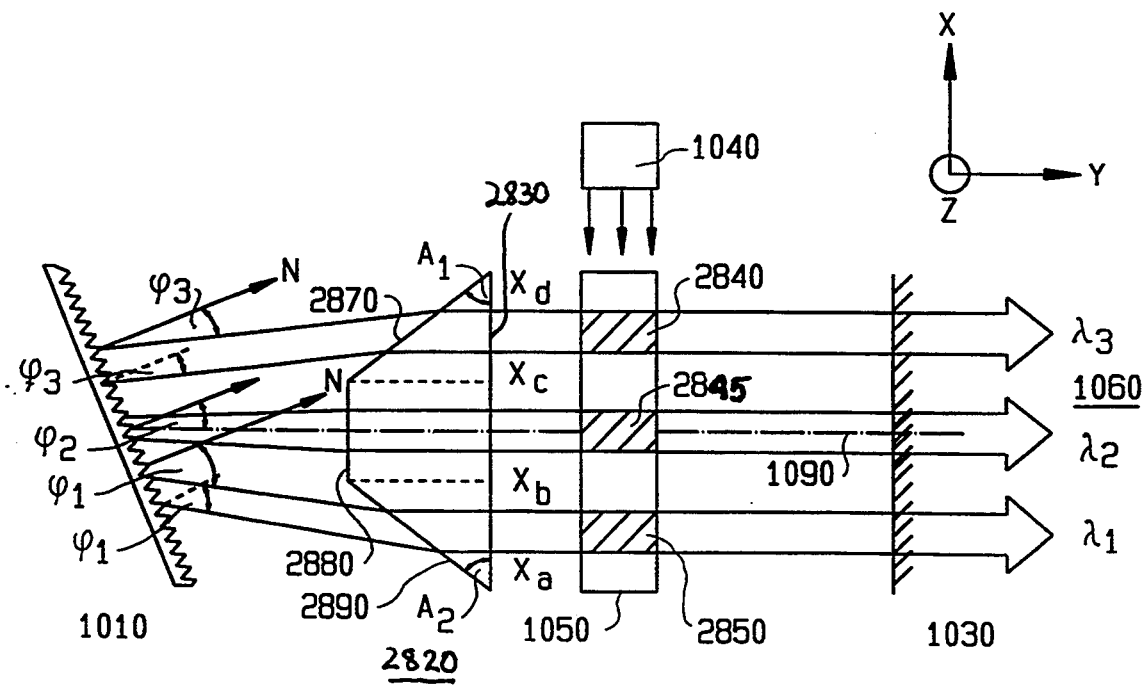
FIG. 28 is a schematic plan of a seventh embodiment of a polychromatic or white light laser having an intracavity, multi-sided prism.

Referring now to FIG. 28, there is illustrated a seventh embodiment similar to that of FIG. 10, except that numeral 2820 denotes a multi-sided prism. Also, pump means 1040 produces N distinct beamlets for pumping N respective portions of active medium 1050. The elements indicated by the same reference numerals as in FIG. 10 are of the same construction as in that figure.

Figure 29:
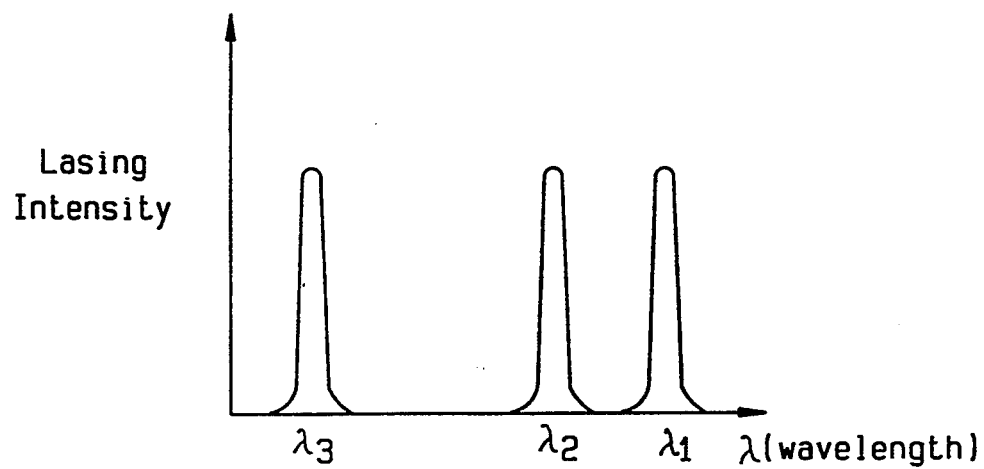
FIG. 29 is a graph of the characteristic spectrum of the polychromatic or white light laser of FIG. 28.

The number of spectral components or beamlets in polychromatic or white light radiation 1060 corresponds to the number of distinct portions of active medium 1050 pumped by pump means 1040 and positioned so as to allow radiation to propagate through the sides of prism 2820. In this seventh embodiment, the spontaneous emission from each pumped portions 2840, 2845 and 2850 of active medium 1050 is incident on one side of prism 2820, namely side 2870, 2880 or 2890. Although in the embodiment of FIG. 10, the radiation wavelengths were spatially dependent, in the present embodiment the desired wavelengths are selected by appropriately choosing the side angles $A_1$ and $A_2$ of prism 2820 with respect to a surface 2830. Note that the side angle of side 2880 is zero. With the correct side prism angle, the radiation is refracted and incident on diffraction grating 1010 at the appropriate auto-collimation or Littrow angle to effect positive feedback only for the desired wavelength of interest. Shown in FIG. 29 is the lasing spectrum of white light radiation 1060. The radiation wavelengths are independent of the spatial position of the pumped portion of the active medium within the regions associated with the sides of the prism, namely regions $X_a-X_b$, $X_b-X_c$ and $X_c-X_d$. It is should be understood that each of these regions is associated with a desired wavelength.

For this seventh embodiment, the relationship between the side prism angle $A_i$ and the desired radiation wavelength $\lambda_i$ is given by:

$$A_i = \arcsin\left[\frac{\sin\Gamma_{io}}{\sqrt{n^2 + 2 - 2n\cos\Gamma_{io}}}\right] \quad (23)$$

$$\Gamma_{io} = \int_{\lambda_o}^{\lambda_i} D_\phi d\lambda \quad (24)$$

where n is the index of refraction of the prism, and $D_\phi$ is the angular dispersion of diffraction grating 1010, and $\lambda_o$ is the radiation wavelength at the center of optical axis 1090.

Figure 30:
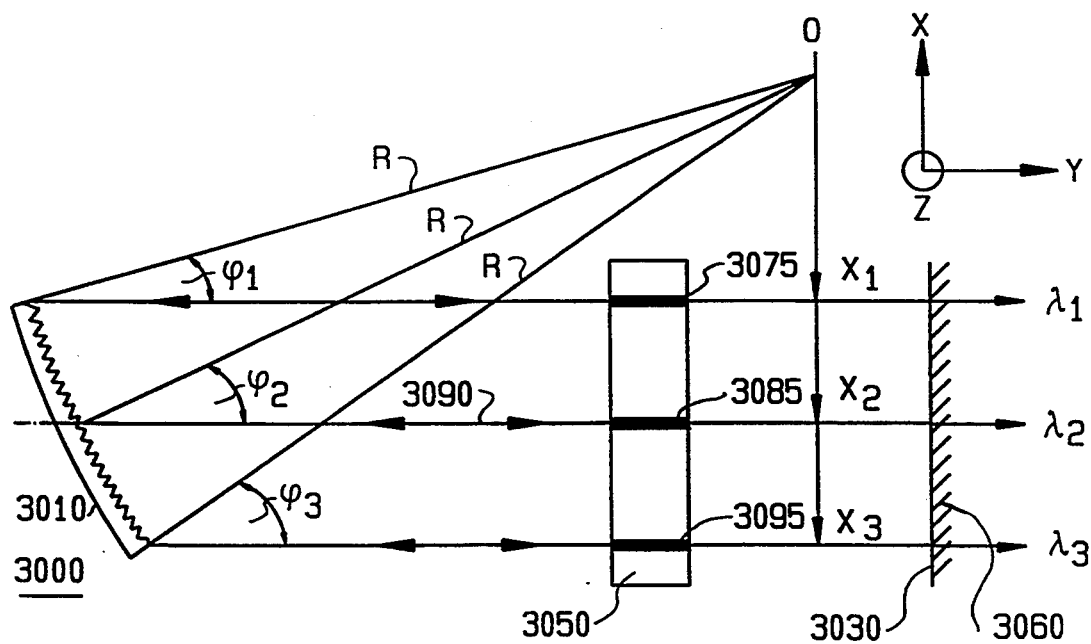
FIG. 30 is a schematic plan of an eighth embodiment of a polychromatic or white light laser with a concave diffraction grating.

Referring now to FIG. 30, there is illustrated an eighth embodiment of the present invention, which is different from embodiments 1–7 in that this embodiment does not employ an intracavity lens as a means to effect mapping the spatial coordinates of the active medium to a corresponding desired radiation wavelength.

White laser 3000 comprises pump means 3040 (not shown), active medium 3050, partially reflecting mirror 3030 and, in place of a planar diffraction grating, a concave diffraction 3010. Instead of using in combination the planar diffraction grating and intracavity lens, the concave diffraction grating is solely used to effect the mapping of the spatial location of the pumped portion of the active medium to a corresponding unique lasing wavelength, i.e., a "spatial-spectral" transformer.

For this eighth embodiment, white light radiation 3060 is similarly realized by simultaneously pumping active medium 3050 at different discrete portions 3075, 3085 and 3095. A plurality of pump beamlets irradiate portions 3075, 3085 and 3095, each portion located at a different distance, X, from optical axis 3090 along a direction parallel to the dispersive axis of diffraction grating 3010. Spontaneous emission from each pumped portion of active medium 3050 propagates toward partially reflective mirror 3030. Only radiation parallel with optical axis 3090 is reflected back toward the corresponding pumped portion. The reflected radiation re-enters the corresponding pumped portion of active medium 3050, is amplified therein, and then propagates as parallel radiation to concave diffraction grating 3010. Concave diffraction grating 3010 diffracts the broadband spectrum radiation characteristic of active medium 3050 into its spectral wavelength components. Each spectral wavelength component propagates at an angle dependent on its wavelength and on its angle of incidence with respect to diffraction grating 3010.

The governing mechanism for achieving lasing simultaneously at a plurality of desired wavelengths is described below. Point O denotes the center of curvature of concave diffraction grating 3010, with R being the radius of curvature. For any arbitrary point on active medium 3050, the distance from point O along a direction perpendicular to optical axis 3090 is X. Thus for portion 3075, the distance from center of curvature O is $X_1$, for portion 3085, the distance is $X_2$, and for portion 3095 the distance is $X_3$. Amplified radiation from each of these portions ($X_1$, $X_2$ and $X_3$) is incident at angles $\phi_1$, $\phi_2$ and $\phi_3$, respectively, with respect to the normal of the surface of concave diffraction grating 3010. It can be shown that the incident angle $\phi$ for any point on the grating can be expressed generally as:

$$\sin\phi = \frac{X}{R} \quad (25)$$

Concave diffraction grating 3010 is operated in an auto-collimation configuration, wherein the relationship between the wavelength $\lambda$ and the angle of incidence $\phi$ is given by equation (2). Accordingly, equating equations (2) and (25) yields:

$$\frac{X}{\lambda} = \frac{KR}{2d} \quad (26)$$

According to equation (26), the radiation wavelength $\lambda$ that satisfies the condition for forced oscillation is linearly dependent on the distance X or the location of the pumped radiation on the active medium. That is, each spatial position of the active medium gives rise to radiation varying linearly with the distance form the optical axis. Noting that the spectral dispersion, $D_1$, is defined as $dX/d\lambda$, it can be further shown from equation (26) that the dispersion is given by a constant, namely $KR/2d$.

Unlike those embodiments which utilize an intracavity lens, the dispersion in this latter embodiment is independent of the angle of incidence. Accordingly, any non-linearities or optical aberrations that are dependent on the angle of incidence, $\phi$, such as chromatic aberration, are eliminated.

Importantly, the use of a concave diffraction grating increases the optical efficiency of the white light laser. This is so because without the intracavity lens the optical loss as a result of surface reflections through the lens is obviated. Also, the concave diffraction grating can be blazed such that the optical feedback is effected through the lower diffraction orders where the efficiency is typically greater. Further, once the blazing angle is set for one wavelength, it will also be substantially set for all other wavelengths.

In one preferred embodiment, mirror 3060 is a dielectric mirror having a reflectivity of ~0.7 in the visible and near infra-red regions, and diffraction grating 3010 is a diffraction grating having a period of 1200 mm$^{-1}$, with a radius of curvature of 500 mm. Furthermore, active medium 3050 is a dye solution of Rhodamine 6G, Rhodamine B and Coumarin 47. Results from experimental practice indicate that with this specific embodiment simultaneous lasing is possible from the visible to the near infra-red spectral regions, with a spectral dispersion of approximately 0.303 mm/nm.

Further, it is anticipated that convex, cylindrical, bifocal, or sphere-cylindrical diffraction gratings may also be used to enhance the optical performance. For example, convex diffraction gratings may be used to increase the wavelength selectivity, while cylindrical or sphere-cylindrical diffraction gratings may be used to increase the lasing power. In accordance with the principles of the invention, however, the axis of dispersion is chosen to lie substantially perpendicular to the propagation direction of the pump beam.

For bifocal or sphere-cylindrical diffraction gratings, the radius of curvature perpendicular to the axis of dispersion is judiciously chosen to achieve a stable resonator. The radius of curvature, however, parallel to the dispersion axis may be chosen to effect the desired linewidth or spectral range of lasing.

Also, it is contemplated that the effective combination of a concave diffraction grating and mirror may be achieved by a planar diffraction grating and a concave, convex, spherical, cylindrical, or sphere-cylindrical mirror, in accordance with principles of the invention discussed above.

Figure 31:
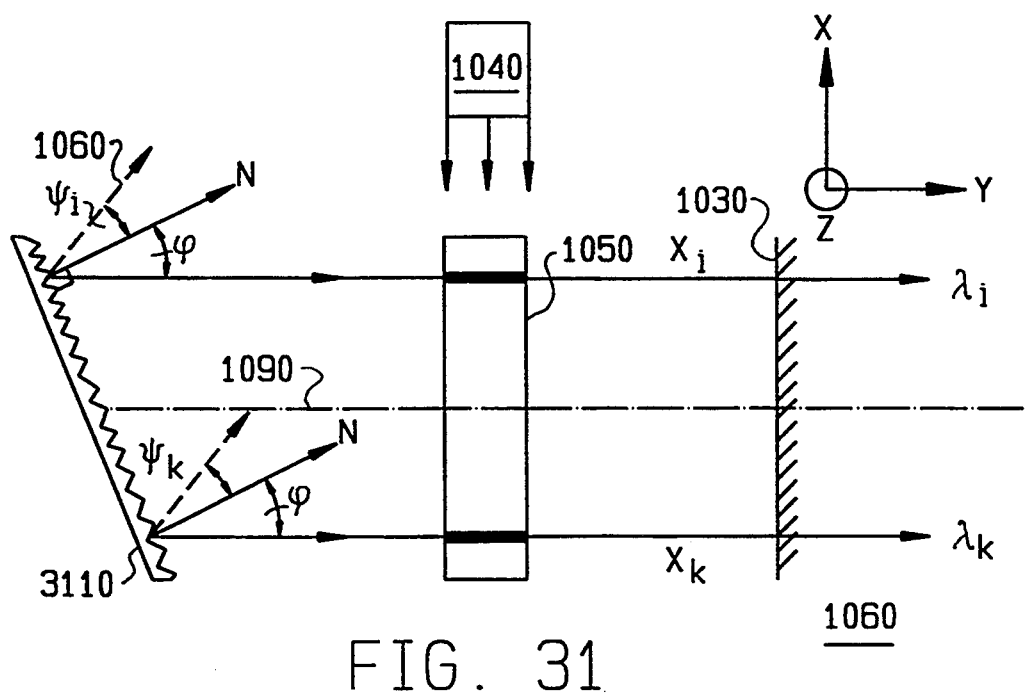
FIG. 31 is a schematic plan of a ninth embodiment of a polychromatic or white light laser having a planar diffraction grating with a variable spacing.

Referring now to FIG. 31, there is illustrated a ninth embodiment of the present invention, in which a planar diffraction grating 3110 is employed. Planar diffraction grating 3110 has a variable spacing or period, d(x), along the axis of dispersion, X. The elements indicated by the same reference numerals as in FIG. 10 are of the same construction as in that figure. Notably, however this ninth embodiment does not use an intracavity lens.

The operation of this ninth embodiment is substantially similar to that of the eighth embodiment. For diffraction grating 3110 operating in an auto-collimation configuration, positive feedback or forced oscillation is only satisfied for radiation having a wavelength λ given by:

$$\lambda(X) = \frac{2d(X)\sin\phi}{K} \quad (27)$$

where d(X) is the period of the diffraction grating as a function of X, λ(X) is the wavelength as a function of X, and K is the diffraction order, and $\phi$ is the angle of incidence. It should be noted that in this embodiment the angle of incidence is the same for each of the spectral components.

If equation (27) is differentiated with respect to X, we obtain:

$$\frac{d\lambda}{dX} = \frac{2\sin\phi}{K} \frac{d}{dX} d(X) \quad (28)$$

In accordance with equation (28), the generated wavelength λ therefore varies with the first order differential of the spacing d(X), given that $\phi$ and K are constants. If the spacing of the diffraction grating varies linearly along a direction perpendicular to the optical axis, then so does the generated radiation wavelength. Moreover, it should be obvious from equation (28) that the linewidth or bandwidth of the generated radiation is dependent also on the size of the pumped portion of the active medium along the direction of the dispersion axis.

Although FIG. 31 illustrates that the white light radiation is provided from mirror 1030, it may be preferable to extract the radiation through the zeroth or first diffraction order of diffraction grating 3110 so as to maximize the optical efficiency.

Results from experimental practice indicate that for the appropriate portion of diffraction grating 3110 to effect positive feedback for radiation near the ultra-violet region (~0.3 μm), the spacing of the diffraction grating is preferably about 3600 mm$^{-1}$, whereas for radiation near the infra-red region (~0.9 μm) the spacing should be about 1200 mm$^{-1}$.

The utility of the above arrangement is that it provides for the feedback radiation to be based on the zeroth or first diffraction order. Furthermore, this arrangement avoids the use of an intracavity lens for performing the spectral-spatial transformation. Hence, it can readily be shown that this arrangement reduces optical loss associated with reflections from the surfaces of the intracavity lens, which may be somewhat significant for off-axis radiation.

It is understood that various other modifications will also be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

We claim:

1. A laser for generating polychromatic or white light radiation having a plurality of wavelength components, said laser comprising:

a mirror;

a diffraction grating, said mirror and diffraction grating spaced apart from each other to form an optical resonant cavity therebetween along an optical axis, said diffraction grating operating to diffract incident radiation into a plurality of diffraction orders along its dispersion axis;

an active medium interposed between said mirror and diffraction grating, said active medium having a broadband emission spectrum;

means for pumping a plurality of portions of said active medium whereby spontaneous emission is emitted from different portions of said active medium, said spontaneous emission having a plurality of wavelength components; and an intracavity lens, said intracavity lens and diffraction grating arranged such that a wavelength component of said spontaneous emission from each of said plurality of portions of said active medium, corresponding to a wavelength component of the polychromatic or white light radiation, is amplified by that portion of said active medium through the $2K^{th}$ diffraction order of said diffraction grating, and said polychromatic or white light radiation is provided through the $K^{th}$ diffraction order of said diffraction grating, where K is a non-zero integer.

2. The laser of claim 1 wherein each wavelength component of said polychromatic or white light radiation is spatially co-linear.

3. The laser of claim 1 wherein said diffraction grating is arranged in a Littrow or auto-collimation configuration.

4. The laser of claim 1 wherein the dispersion axis of said diffraction grating is substantially perpendicular to said optical axis.

5. The laser of claim 1 wherein said pump means irradiates said plurality of portions of said active medium along a direction parallel to the dispersion axis of said diffraction grating.

6. The laser of claim 5 wherein said pump means includes
a pump laser, and
means for directing radiation from said pump laser onto said active medium.

7. The laser of claim 1 wherein said intracavity lens is disposed between said diffraction grating and said active medium.

8. The laser of claim 7 wherein said diffraction grating is located a focal length away from said intracavity lens.

9. The laser of claim 1 wherein said intracavity lens and said mirror are integrated with said active medium.

10. The laser of claim 1 wherein the polychromatic or white light radiation comprises spectral segments of a continuous radiation spectrum.

11. The laser of claim 1 wherein the polychromatic or white light radiation comprises a plurality of discrete radiation wavelengths.

12. The laser of claim 1 wherein the polychromatic or whim light radiation comprises radiation of a continuous spectrum.

13. The laser of claim 1 wherein said active medium includes a solution of organic dyes.

14. The laser of claim 1 wherein said active medium includes a plurality of dye cells.

15. The laser of claim 1 wherein said active medium includes a solid state medium.

16. A laser for generating polychromatic or white light radiation having a plurality of wavelength components, each spatially separated along an axis, said laser comprising:
a mirror;
a diffraction grating, said mirror and diffraction grating spaced apart from each other to form an optical resonant cavity therebetween along an optical axis, said diffraction grating operating to diffract incident radiation into a plurality of diffraction orders along a dispersion axis;
an active medium interposed between said mirror and said diffraction grating, said active medium having a broadband emission spectrum;
means for pumping a plurality of portions of said active medium whereby spontaneous emission is emitted from different portions of said active medium, said spontaneous emission having a plurality of wavelength components; and
an intracavity lens, said intracavity lens and diffraction grating arranged such that a wavelength component of said spontaneous emission from each of said plurality of portions of said active medium, corresponding to a wavelength component of the polychromatic or white light radiation, is reflected from said mirror along a direction substantially parallel to the optical axis and amplified by that portion of said active medium through a diffraction order of said diffraction grating, such that each of said plurality of wavelength components is spatially separated along an axis.

17. The laser of claim 16 wherein for a desired polychromatic or white light spectral range of wavelengths, $\lambda_1$ to $\lambda_2$, the focal length, F, of said intracavity lens is $$|F| \leq \frac{S - \sin\Gamma_{12}}{2(1 - \cos\Gamma_{12})}$$

where S is the size of the smallest intracavity element along the direction of the axis of dispersion, and $\Gamma_{12}$ is the angular separation between wavelengths $\lambda_1$ and $\lambda_2$.

18. The laser of claim 16 wherein each wavelength component of the polychromatic or white light radiation is uniquely spatially mapped along a direction parallel to the dispersion axis of said diffraction grating.

19. The laser of claim 16 wherein said diffraction grating is arranged in a Littrow or auto-collimation configuration.

20. The laser of claim 16 wherein the dispersion axis of said diffraction grating is substantially perpendicular to said optical axis.

21. The laser of claim 16 wherein said pump means irradiates said plurality of portions of said active medium along a direction parallel to the dispersion axis of said diffraction grating.

22. The laser of claim 21 wherein said pump means includes
a pump laser, and
means for directing radiation from said pump laser onto said active medium.

23. The laser of claim 16 wherein said intracavity lens is disposed between said diffraction grating and said active medium.

24. The laser of claim 16 wherein said intracavity lens and said mirror are integrated with said active medium.

25. The laser of claim 16 wherein the polychromatic or white light radiation comprises spectral segments of a continuous radiation spectrum.

26. The laser of claim 16 wherein said polychromatic or white light radiation comprises a plurality of discrete radiation wavelengths.

27. The laser of claim 16 wherein said polychromatic or white light radiation comprises radiation of a continuous spectrum.

28. The laser of claim 16 wherein said active medium includes a solution of organic dyes.

29. The laser of claim 16 wherein said active medium includes a plurality of dye cells.

30. The laser of claim 16 wherein said active medium includes a solid state medium.

31. The laser of claim 16 wherein egress for the polychromatic or white light radiation is provided through said mirror.

32. The laser of claim 16 wherein egress for the polychromatic or white light radiation is provided through one of the diffraction orders of said diffraction grating.

33. The laser of claim 16 wherein said diffraction grating has a variable blazing angle along the dispersion axis thereof.

34. The laser of claim 33 wherein the blazing angle along the dispersion axis is chosen in accordance with the angular dispersion of incident radiation.

35. The laser of claim 16 wherein said intracavity lens is a concave lens.

36. The laser of claim 16 wherein said intracavity lens is a convex lens.

37. The laser of claim 16 wherein said intracavity lens is a cylindrical lens.

38. The laser of claim 16 wherein said intracavity lens is a variable focal length lens.

39. The laser of claim 38 wherein the focal length of said variable focal length lens is chosen in accordance with the desired linewidth or bandwidth of the polychromatic or white light radiation.

40. A laser for generating polychromatic or white light radiation having a plurality of wavelength components, each spatially separated along an axis, said laser comprising:
   a mirror;
   a diffraction grating, said mirror and diffraction grating spaced apart from each other to form an optical resonant cavity therebetween along an optical axis, said diffraction grating operating to diffract incident radiation into a plurality of diffraction orders along its dispersion axis;
   an active medium interposed between said mirror and diffraction grating, said active medium having a broadband emission spectrum and said active medium having at least one non-lasing portion;
   means for pumping a plurality of portions of said active medium whereby spontaneous emission is emitted from different portions of said active medium, said spontaneous emission having a plurality of wavelength components; and
   an intracavity lens, said intracavity lens and diffraction grating arranged such that a wavelength component of said spontaneous emission from each of said plurality of portions of said active medium, corresponding to a wavelength component of the polychromatic or white light radiation is amplified by that portion of said active medium through a diffraction order of said diffraction grating; and
   means positioned between said intracavity lens and said active medium for directing radiation from portions of the active medium substantially on either side of the edges of said at least one non-lasing portion so as to fall on said diffraction grating with substantially the same angle of incidence.

41. The laser of claim 40 wherein said means for directing is a prism.

42. The laser of claim 40 wherein said means for directing is a compensatory glass plate having first and second edges, said first and second edges having the optical characteristics of a prism.

43. The laser of claim 40 wherein said means for directing is integrated with said active medium.

44. The laser of claim 40 wherein said mean for directing is integrated with said active medium and said intracavity lens.

45. The laser of claim 40 wherein each wavelength component of the polychromatic or white light radiation is uniquely spatially mapped along a direction parallel to the dispersion axis of said diffraction grating.

46. The laser of claim 40 wherein said diffraction grating is arranged in a Littrow or auto-collimation configuration.

47. The laser of claim 40 wherein the dispersion axis of said diffraction grating is substantially perpendicular to said optical axis.

48. The laser of claim 40 wherein said pump means irradiates said plurality of portions of said active medium along a direction parallel to the dispersion axis of said diffraction grating.

49. The laser of claim 48 wherein said pump means includes
   a pump laser, and
   means for directing radiation from said pump laser onto said active medium.

50. The laser of claim 40 wherein said intracavity lens is disposed between said diffraction grating and said active medium.

51. The laser of claim 40 wherein the polychromatic or white light radiation comprises spectral segments of a continuous radiation spectrum.

52. The laser of claim 40 wherein said polychromatic or white light radiation comprises a plurality of discrete radiation wavelengths.

53. The laser of claim 40 wherein said polychromatic or white light radiation comprises radiation of a continuous spectrum.

54. The laser of claim 40 wherein said active medium includes a solution of organic dyes.

55. The laser of claim 40 wherein said active medium includes a plurality of dye cells.

56. The laser of claim 40 wherein said active medium includes a solid state medium.

57. The laser of claim 40 wherein egress for the polychromatic or white light radiation is provided through said mirror.

58. The laser of claim 40 wherein egress for the polychromatic or white light radiation is provided through one of the diffraction orders of said diffraction grating.

59. The laser of claim 40 wherein said intracavity lens is a bi-focal lens having first and second focal lengths in planes mutually perpendicular to each other.

60. The laser of claim 59 wherein the first focal length along a plane parallel to the dispersion axis of said diffraction grating is chosen in accordance with a desired lasing spectrum of the polychromatic or white light radiation.

61. The laser of claim 60 wherein the second focal length along a plane perpendicular to the dispersion axis of said diffraction grating is chosen in accordance with the desired spatial field distribution of the polychromatic or white light radiation.

62. A laser for generating polychromatic or white light radiation having a plurality of wavelength components, each spatially separated along an axis, said laser comprising:
   a mirror;
   a diffraction grating, said mirror and diffraction grating spaced apart from each other to form an optical resonant cavity therebetween along an optical axis, said diffraction grating operating to diffract incident radiation into a plurality of diffraction orders along its dispersion axis;
   an active medium interposed between said mirror and diffraction grating, said active medium having a broadband emission spectrum;

means for pumping a plurality of portions of said active medium whereby spontaneous emission is emitted from different portions of said active medium, said spontaneous emission having a plurality of wavelength components; and an intracavity lens having a plurality of segmented lens portions, each of said segmented lens portions and said diffraction grating arranged such that a wavelength component of said Spontaneous emission from each of said plurality of portions of said active medium, corresponding to a wavelength component of the polychromatic or white light radiation, is amplified by that portion of said active medium through one of the diffraction order of said diffraction grating such that each of said plurality of wavelength components is spatially separated along an axis, each segmented lens portion associated with a portion of said active medium portion, and each segmented lens portions having a center of curvature offset from said optical axis along the direction of the dispersion axis.

63. The laser of claim 62 wherein the desired linewidth of each wavelength component is determined by the focal length of an associated segmented lens portion.

64. The laser of claim 62 wherein the desired range of spectral tunability for each wavelength component is determined by length along the axis of dispersion of an associated segmented lens portion.

65. The laser of claim 64 wherein the spectral position of the range of spectral tunability is determined by the offset of the center of curvature of the associated segmented lens portion.

66. The laser of claim 62 wherein each wavelength component of said polychromatic or white light radiation is spatially mapped along a direction parallel to the dispersion axis of said diffraction grating.

67. The laser of claim 62 wherein said diffraction grating is arranged in a Littrow or auto-collimation configuration.

68. The laser of claim 62 wherein the dispersion axis of said diffraction grating is substantially perpendicular to said optical axis.

69. The laser of claim 62 wherein said pump means irradiates said plurality of portions of said active medium along a direction parallel to the dispersion axis of said diffraction grating.

70. The laser of claim 69 wherein said pump means includes
a pump laser, and
means for directing radiation from said pump laser onto said active medium.

71. The laser of claim 62 wherein said intracavity lens is disposed between said diffraction grating and said active medium.

72. The laser of claim 62 wherein said intracavity lens and said mirror are integrated with said active medium.

73. The laser of claim 62 wherein the polychromatic or white light radiation comprises spectral segments of a continuous radiation spectrum.

74. The laser of claim 62 wherein the polychromatic or white light radiation comprises a plurality of discrete radiation wavelengths.

75. The laser of claim 62 wherein said polychromatic or white light radiation comprises radiation of a continuous spectrum.

76. The laser of claim 62 wherein said active medium includes a solution of organic dyes.

77. The laser of claim 62 wherein said active medium includes a plurality of dye cells.

78. The laser of claim 62 wherein said active medium includes a solid state medium.

79. The laser of claim 62 wherein egress for the polychromatic or white light radiation is provided through said mirror.

80. The laser of claim 62 wherein egress for the polychromatic or white light radiation is provided through one of the diffraction orders of said diffraction grating.

81. An optical apparatus comprising:
a laser for generating polychromatic or whim light radiation having a plurality of wavelength components, said radiation having a spatial spectral dispersion along an axis, and said laser having an optical axis along which direction said polychromatic or white light radiation propagates;

a diffraction grating having an axis of dispersion substantially perpendicular to said optical axis and parallel along the direction of the spectral dispersion of the polychromatic or white light radiation, said diffraction grating having an angular dispersion;

means for pumping a plurality of portions of said active medium whereby spontaneous emission is emitted from different portions of said active medium, said spontaneous emission having a plurality of wavelength components; and a lens positioned between said diffraction grating and said laser for directing a wavelength component of said spontaneous emission from each of said plurality of portions of said active medium, corresponding to a wavelength component of the polychromatic or white light radiation onto said diffraction grating, said diffraction grating located a focal length from said lens, said lens and said diffraction grating arranged such that a wavelength component of said Spontaneous emission corresponding to a wavelength component of the polychromatic or white light radiation incident on the diffraction grating is diffracted as co-linear beams, wherein the angular dispersion of said diffraction grating multiplied by the focal length of said lens is equal to the linear dispersion of the polychromatic or white light radiation.

82. A laser for generating polychromatic or white light radiation having a plurality of wavelength components, each spatially separated along an axis, said laser comprising:
a mirror;
a non-planar diffraction grating, said mirror and diffraction grating spaced apart from each other to form an optical resonant cavity therebetween along an optical axis;
an active medium interposed between said mirror and diffraction grating, said active medium having a broadband emission spectrum; and
means for pumping a plurality of portions of said active medium whereby spontaneous emission is emitted from different portions of said active medium, said spontaneous emission having a plurality of wavelength components, said diffraction grating arranged such that a wavelength component of said spontaneous emission from each of said plurality of portions of said active medium, corresponding to a wavelength component of the polychromatic or white light radiation, is amplified by that portion of said active medium.

83. The laser of claim 82 wherein said non-planar diffraction grating is concave.

84. The laser of claim 83 wherein the polychromatic or white light radiation has a spatial spectral dispersion of KR/2d, where R is the radius of curvature of said diffraction grating, d is the grating spacing of said diffraction grating and K is the diffraction order through which the wavelength components of the polychromatic or white light radiation are amplified by said active medium.

85. The laser of claim 82 wherein said non-planar diffraction grating is convex.

86. The laser of claim 82 wherein said non-planar diffraction grating is bi-focal.

87. The laser of claim 82 wherein said diffraction grating is arranged in a Littrow or auto-collimation configuration.

88. The laser of claim 82 wherein the dispersion axis of said diffraction grating is substantially perpendicular to said optical axis.

89. The laser of claim 82 wherein said pump means irradiates said plurality of portions of said active medium along a direction parallel to the dispersion axis of said diffraction grating.

90. The laser of claim 89 wherein said pump means includes
a pump laser, and
means for directing radiation from said pump laser onto said active medium.

91. The laser of claim 82 wherein said polychromatic or white light radiation comprises a plurality of discrete radiation wavelengths.

92. The laser of claim 82 wherein the polychromatic or white light radiation comprises spectral segments of a continuous radiation spectrum.

93. The laser of claim 82 wherein said polychromatic or white light radiation comprises radiation of a continuous spectrum.

94. The laser of claim 82 wherein said active medium includes a solution of organic dyes.

95. The laser of claim 82 wherein said active medium includes a plurality of dye cells.

96. The laser of claim 82 wherein said active medium includes a solid state medium.

97. The laser of claim 82 wherein egress for the polychromatic or white light radiation is provided through said mirror.

98. The laser of claim 82 wherein egress for the polychromatic or white light radiation is provided through one of the diffraction orders of said diffraction grating.

99. A laser for generating polychromatic or white light radiation having a plurality of wavelength components, each spatially separated along an axis, said laser comprising:
a mirror;
a diffraction grating having a variable spacing, said mirror and diffraction grating spaced apart from each other to form an optical resonant cavity therebetween along an optical axis, said diffraction grating operating to diffract incident radiation into a plurality of diffraction orders along its dispersion axis;
an active medium interposed between said mirror and diffraction grating, said active medium having a broadband emission spectrum; and
means for pumping a plurality of portions of said active medium whereby spontaneous emission is emitted from different portions of said active medium, said spontaneous emission having a plurality of wavelength components, said diffraction grating arranged such that a wavelength component of said spontaneous emission from each of said plurality of portions of said active medium, corresponding to a wavelength component of the polychromatic or white light radiation, is amplified by that portion of said active medium through a diffraction order of said diffraction grating.

100. The laser of claim 99 wherein said diffraction grating is arranged in a Littrow or auto-collimation configuration.

101. The laser of claim 99 wherein the dispersion axis of said diffraction grating is substantially perpendicular to said optical axis.

102. The laser of claim 99 wherein said pump means irradiates said plurality of portions of said active medium along a direction parallel to the dispersion axis of said diffraction grating.

103. The laser of claim 102 wherein said pump means includes
a pump laser, and
means for directing radiation from said pump laser onto said active medium.

104. The laser of claim 99 wherein the polychromatic or white light radiation comprises spectral segments of a continuous radiation spectrum.

105. The laser of claim 99 wherein said polychromatic or white light radiation comprises a plurality of discrete radiation wavelengths.

106. The laser of claim 99 wherein said polychromatic or whim light radiation comprises radiation of a continuous spectrum.

107. The laser of claim 99 wherein said active medium includes a solution of organic dyes.

108. The laser of claim 99 wherein said active medium includes a plurality of dye cells.

109. The laser of claim 99 wherein said active medium includes a solid state medium.

110. The laser of claim 99 wherein egress for the polychromatic or white light radiation is provided through said mirror.

111. The laser of claim 99 wherein said polychromatic or white light radiation is provided through one of the diffraction orders of said diffraction grating.

* * * * *